US012701196B1

(12) United States Patent
Patel et al.

(10) Patent No.: US 12,701,196 B1
(45) Date of Patent: Aug. 4, 2026

(54) VIDEO RECORDING BASED ON OBJECT TRACKING

(71) Applicant: SimpliSafe, Inc., Boston, MA (US)

(72) Inventors: Denim Patel, Nashua, NH (US); Nicholas Setzer, Charlestown, MA (US); Shekhar Sastry, Arlington, MA (US); Danielle Dean, Westford, MA (US)

(73) Assignee: SimpliSafe, Inc., Boston, MA (US)

( * ) Notice: Subject to any disclaimer, the term of this patent is extended or adjusted under 35 U.S.C. 154(b) by 0 days.

(21) Appl. No.: 19/314,083

(22) Filed: Aug. 29, 2025

(51) Int. Cl.
| | |
|---|---|
| *H04N 5/91* | (2006.01) |
| *G06V 10/25* | (2022.01) |
| *G06V 20/40* | (2022.01) |
| *G11B 27/36* | (2006.01) |

(52) U.S. Cl.
CPC .............. *H04N 5/91* (2013.01); *G06V 10/25* (2022.01); *G06V 20/41* (2022.01); *G11B 27/36* (2013.01)

(58) Field of Classification Search
CPC .......... H04N 5/91; G06V 10/25; G06V 20/41; G11B 27/36
See application file for complete search history.

(56) References Cited

U.S. PATENT DOCUMENTS

| | | | |
|---|---|---|---|
| 12,169,940 B2 | 12/2024 | Xu et al. | |
| 2019/0130191 A1* | 5/2019 | Zhou | G06V 20/52 |
| 2025/0200975 A1* | 6/2025 | Shin | G06V 20/52 |

* cited by examiner

*Primary Examiner* — Girumsew Wendmagegn
(74) *Attorney, Agent, or Firm* — Pierce Atwood LLP

(57) ABSTRACT

In accordance with one disclosed method, a computing device may determine that a plurality of frames of image data represent an object of a first type and may further determine at least first and second parameters indicative of first and second positions of a bounding box of the object within first and second frames, respectively. The computing device may calculate, using at least the first parameter and the second parameter, a rate at which a position of the bounding box is moving from frame to frame within the plurality of frames and may determine a variable that is based at least in part on the rate. Based at least in part on the variable satisfying a criterion, the computing device may cause acquired video to be recorded in a datastore.

20 Claims, 12 Drawing Sheets

500

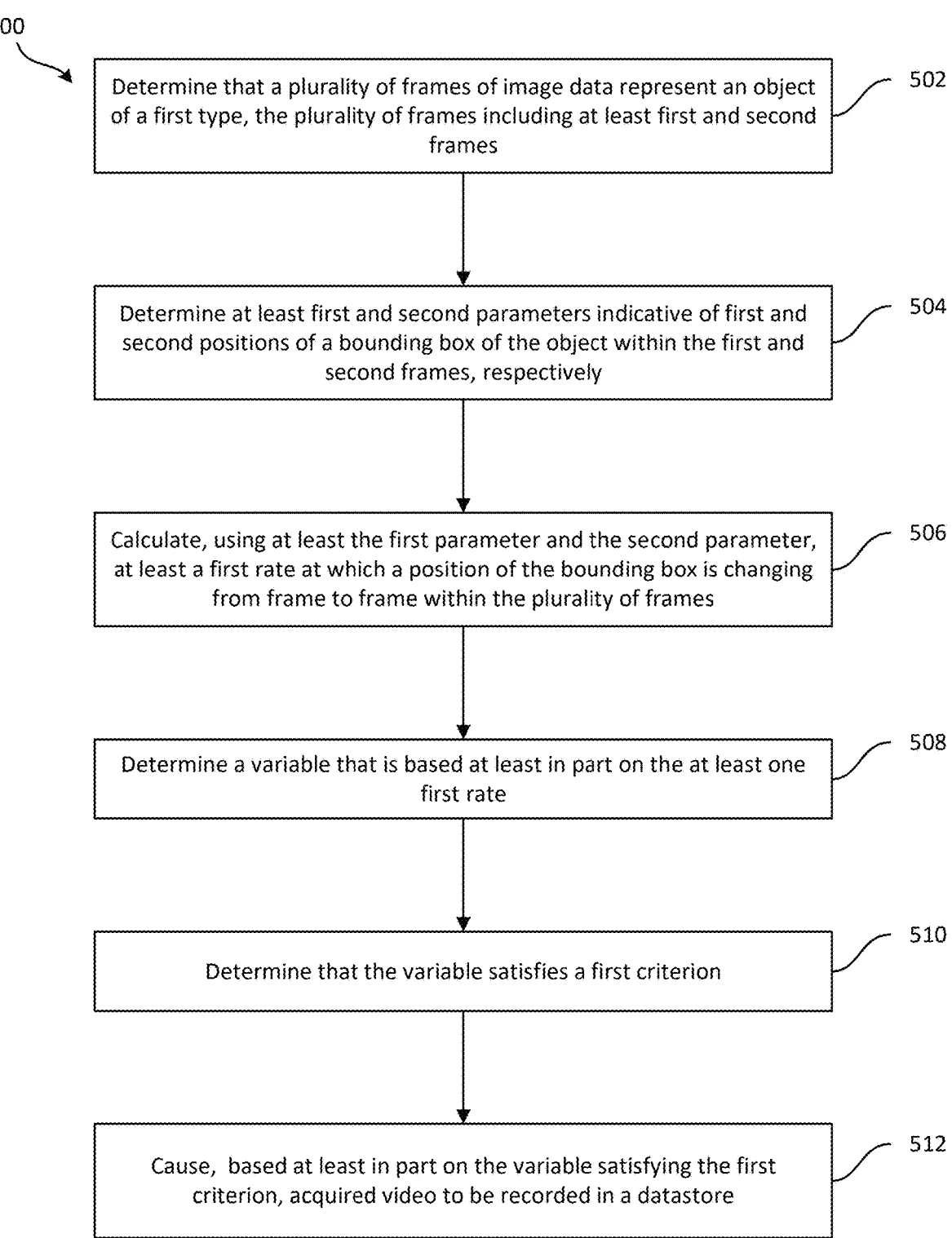

502

Determine that a plurality of frames of image data represent an object of a first type, the plurality of frames including at least first and second frames

504

Determine at least first and second parameters indicative of first and second positions of a bounding box of the object within the first and second frames, respectively

506

Calculate, using at least the first parameter and the second parameter, at least a first rate at which a position of the bounding box is changing from frame to frame within the plurality of frames

508

Determine a variable that is based at least in part on the at least one first rate

510

Determine that the variable satisfies a first criterion

512

Cause, based at least in part on the variable satisfying the first criterion, acquired video to be recorded in a datastore

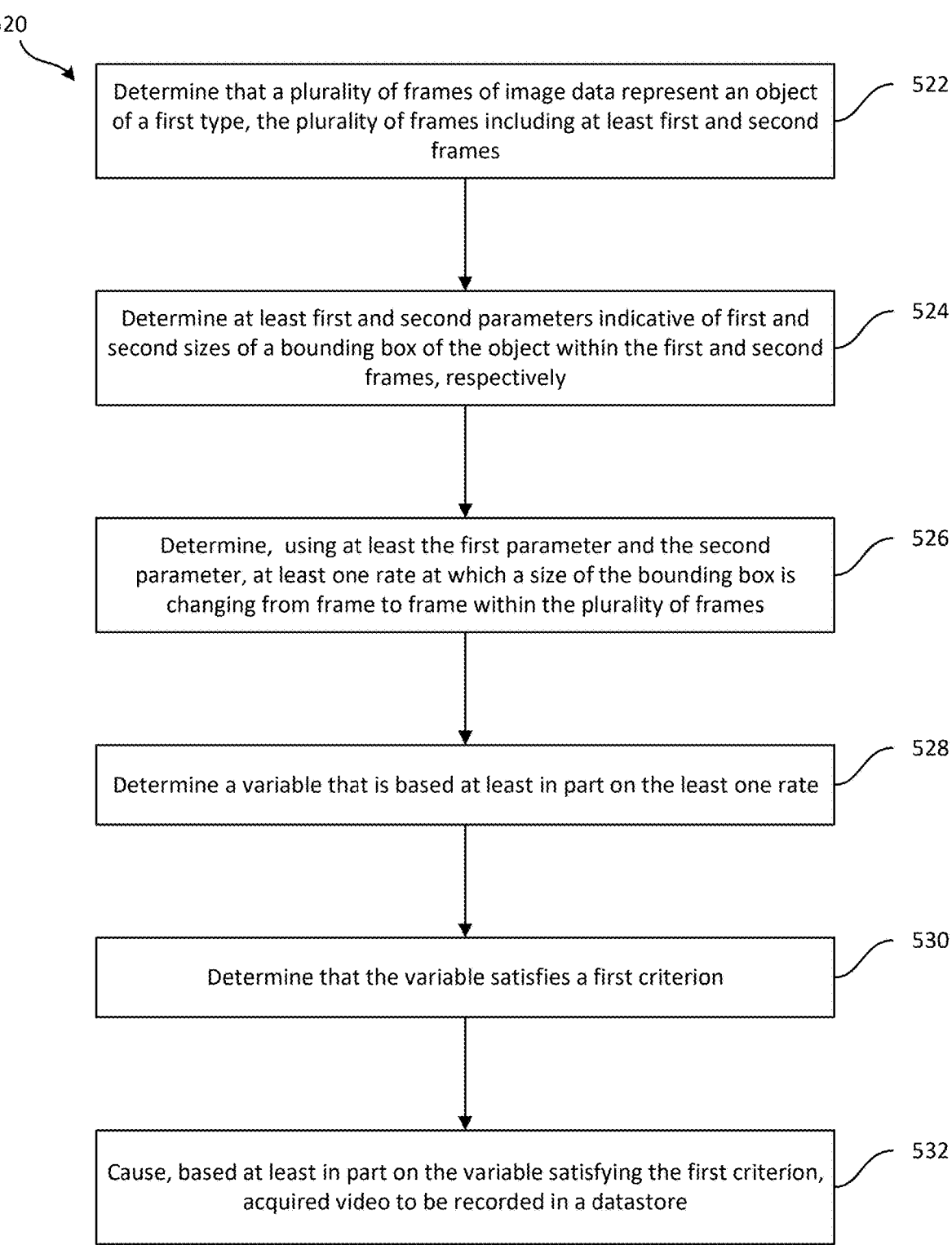

522

Determine that a plurality of frames of image data represent an object of a first type, the plurality of frames including at least first and second frames

524

Determine at least first and second parameters indicative of first and second sizes of a bounding box of the object within the first and second frames, respectively

526

Determine, using at least the first parameter and the second parameter, at least one rate at which a size of the bounding box is changing from frame to frame within the plurality of frames

528

Determine a variable that is based at least in part on the least one rate

530

Determine that the variable satisfies a first criterion

532

Cause, based at least in part on the variable satisfying the first criterion, acquired video to be recorded in a datastore

FIG. 5B

Figure 6:
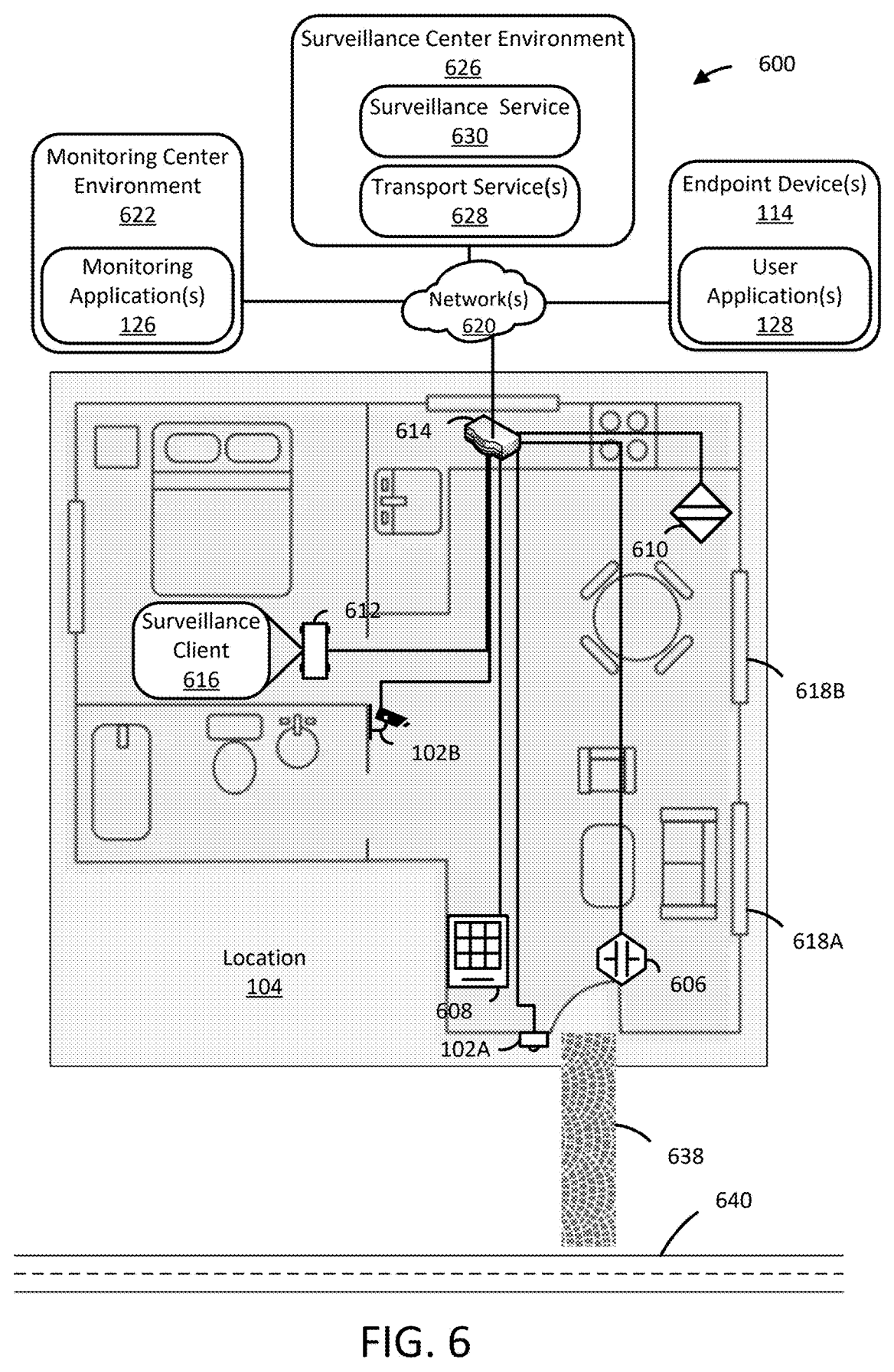

Surveillance Center Environment
626

Surveillance Service
630

Transport Service(s)
628

600

Monitoring Center Environment
622

Monitoring Application(s)
126

Network(s)
620

Endpoint Device(s)
114

User Application(s)
128

614

Surveillance Client
616

612

610

618B

102B

618A

606

Location
104

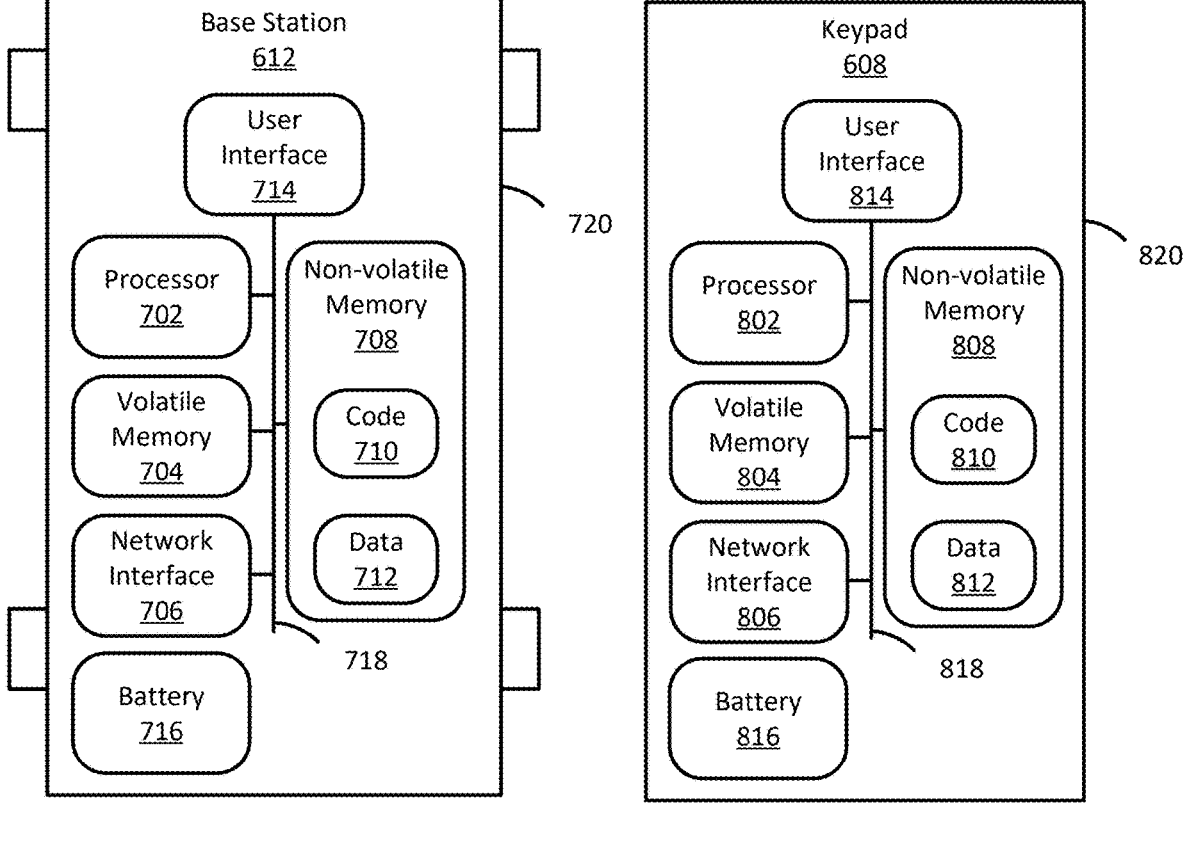
FIG. 7                    FIG. 8

VIDEO RECORDING BASED ON OBJECT TRACKING

BACKGROUND

Some security systems enable remote monitoring of locations using cameras and other equipment.

SUMMARY

In some aspects, the techniques described herein relate to a method, including: determining, by a computing device, that a plurality of frames of image data represent an object of a first type, the plurality of frames including at least first and second frames; determining, by the computing device, at least first and second parameters indicative of first and second positions of a bounding box of the object within the first and second frames, respectively; calculating, by the computing device and using at least the first parameter and the second parameter, at least one first rate at which a position of the bounding box is changing from frame to frame within the plurality of frames; determining, by the computing device, a variable that is based at least in part on the at least one first rate; determining, by the computing device, that the variable satisfies a first criterion; and causing, by the computing device and based at least in part on the variable satisfying the first criterion, acquired video to be recorded in a datastore.

In some aspects, the techniques described herein relate to a method, including: determining, by a computing device, that a plurality of frames of image data represent an object of a first type, the plurality of frames including at least first and second frames; determining, by the computing device, at least first and second parameters indicative of first and second sizes of a bounding box of the object within the first and second frames, respectively; determining, by the computing device and using at least the first parameter and the second parameter, at least one rate at which a size of the bounding box is changing from frame to frame within the plurality of frames; determining, by the computing device, a variable that is based at least in part on the at least one rate; determining, by the computing device, that the variable satisfies a first criterion; and causing, by the computing device and based at least in part on the variable satisfying the first criterion, acquired video to be recorded in a datastore.

In some aspects, the techniques described herein relate to a system, including: one or more processors; and one or more computer-readable mediums encoded with instructions which, when executed by the one or more processors, cause the system to: determine a plurality of frames of image data represent an object of a first type, the plurality of frames including at least first and second frames; determine at least first and second parameters indicative of first and second positions of a bounding box of the object within the first and second frames, respectively; calculate, and using at least the first parameter and the second parameter, at least one first rate at which a position of the bounding box is changing from frame to frame within the plurality of frames; determine a variable that is based at least in part on the at least one first rate; determine that the variable satisfies a first criterion; and cause, based at least in part on the variable satisfying the first criterion, acquired video to be recorded in a datastore.

BRIEF DESCRIPTION OF THE DRAWINGS

Additional examples of the disclosure, as well as features and advantages thereof, will become more apparent by reference to the description herein taken in conjunction with the accompanying drawings which are incorporated in and constitute a part of this disclosure. The figures are not necessarily drawn to scale.

FIG. 5A shows a first example process that may be performed by a computing device, e.g., within the camera shown in FIG. 1, in accordance with some embodiments of the present disclosure.

FIG. 5B shows a second example process that may be performed by a computing device, e.g., within the camera shown in FIG. 1, in accordance with some embodiments of the present disclosure.

FIG. 6 shows an example implementation of a security system, in accordance with some embodiments of the present disclosure.

FIG. 7 shows an example implementation of the base station of the security system shown in FIG. 6, in accordance with some embodiments of the present disclosure.

FIG. 8 shows an example implementation of the keypad of the security system shown in FIG. 6, in accordance with some embodiments of the present disclosure.

DETAILED DESCRIPTION

Figure 1:
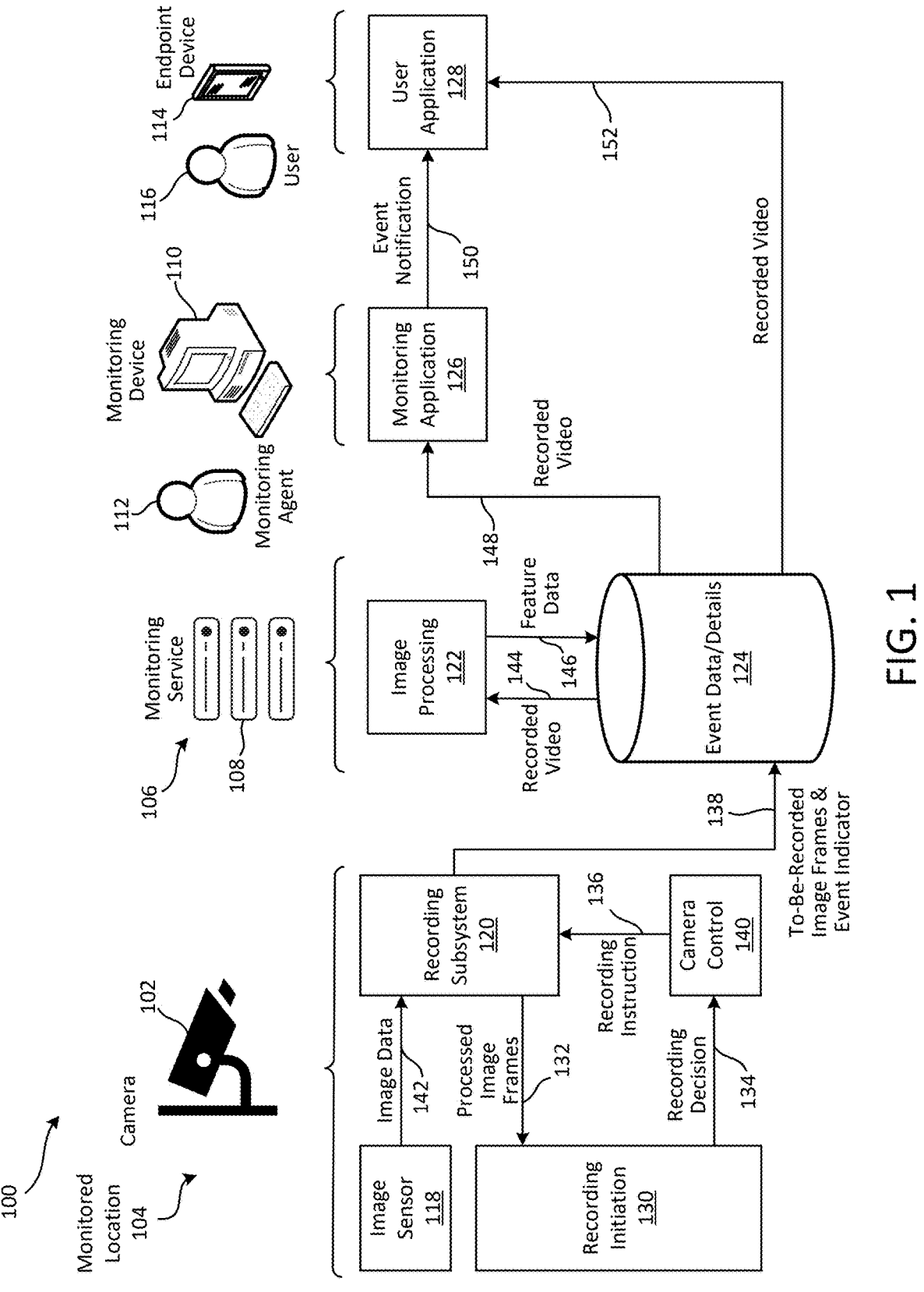
FIG. 1 shows an example security system configured to initiate recording of video based on object tracking, in accordance with some embodiments of the present disclosure.

Security systems oftentimes employ a video camera to capture and/or record video in response to detecting motion in the vicinity of the camera. For instance, some cameras employ passive infrared (PIR) sensors or perform computer vision (CV) analysis on acquired image data to detect motion, and initiate the recording of video data, e.g., by streaming acquired video to a server, when such motion is detected. Frequently, however, the video recorded by such systems is of innocuous events, such as trees or debris blowing in the wind. Processing and reviewing such "false recordings" can impose a significant burden on security systems and/or their users, such as by necessitating the storage and processing of massive quantities of meaningless video data or inundating a homeowner with notifications about irrelevant activity.

To reduce the occurrence of such false recordings, some existing cameras utilize a dual system to initiate video recordings, incorporating both motion detection and object (e.g., person) detection technologies. In operation, such systems begin recording video only when two conditions (motion and person detection) are met simultaneously. In particular, upon the detection of motion via CV processing, a secondary system can employ an object detection process (e.g., YOLO) to analyze the scene to detect the presence of people, and the camera can initiate the recording of video only if the "bounding box" of the person overlaps substantially with the "bounding box" of the detected motion.

While effective to some degree, such systems still tend to produce an undesirable number of false recordings. That is, in such systems, unwanted recordings are often triggered when the object detection system inaccurately identifies an object as a person. For instance, movement such as swaying tree branches or shifts in lighting can trigger motion detection. If, at the same time, the object detection system mistakenly identifies a stationary object, like a trash can, as a person, the camera will erroneously trigger a recording. This combination of unrelated motion and inaccurate object recognition tends to lead to a high number of unnecessary recordings.

Disclosed are techniques to reduce the initiation of such false recordings by a camera. In some implementations, in addition to performing object detection, one or more components of the camera may track the movement of a detected object over time and initiate recording of video in response to a determination the tracked movement satisfies one or more criteria. The use of such a technique may enable the camera to accurately distinguish between stationary and genuinely moving objects, thus ensuring that only relevant video is recorded. Among other things, this may ensure that users receive only relevant recordings, enhancing their experience, and may allow monitoring agents to more effectively focus on actual security events, thereby improving operational efficiency.

For the purposes of promoting an understanding of the principles of the present disclosure, reference will now be made to the examples illustrated in the drawings, and specific language will be used to describe the same. It will nevertheless be understood that no limitation of the scope of the examples described herein is thereby intended.

FIG. 1 shows an example security system 100 configured in accordance with some embodiments of the present disclosure. As shown, the security system 100 may include one or more cameras 102 disposed at a monitored location 104 (e.g., a residence, business, parking lot, etc.), a monitoring service 106 (e.g., including one or more servers 108) located remote from the camera(s) 102 (e.g., within a cloud-based service such as the surveillance center environment 626 described below in connection with FIGS. 6 and 10), one or more monitoring devices 110 operated by respective monitoring agents 112, and one or more endpoint devices 114 operated by respective users 116. Although not illustrated in FIG. 1, it should be appreciated the various illustrated components may communicate with one another via one or more networks, e.g., the internet.

As shown in FIG. 1, in some implementations, the camera 102 may include, among other components, an image sensor 118, a recording subsystem 120, a recording initiation component 130, and a camera control component 140. In some implementations, the recording subsystem 120, the recording initiation component 130, and the camera control component 140, as well as the various subcomponents of the recording initiation component 130 and the camera control component 140 described below in connection with FIGS. 2 and 3, may be implemented using one or more processors (e.g., processor 902 shown in FIG. 9) and one or more computer-readable mediums (e.g., volatile memory 904 and/or non-volatile memory 908 shown in FIG. 9) encoded with instructions which, when executed by the one or more processors, cause the camera 102 to implement the functionality described herein. In other implementations, one or more of such components may additionally or alternatively be implemented, in whole or in part, using one or more hardware and/or firmware devices.

In some implementations, the recording initiation component 130 may be responsible for determining when the camera 102 is to initiate recording of video acquired by the image sensor 118, e.g., in response to determining that movement of a tracked object satisfies one or more criteria. Example subcomponents of recording initiation component 130, and example processes that may be performed by those subcomponents, are described below in connection with FIGS. 3-5.

As indicated by an arrow an arrow 132 in FIG. 1, the recording initiation component 130 may receive processed image frames from the recording subsystem 120 and, as indicated by an arrow 134, in response to determining that those image frames meet certain criteria (including one or more criteria concerning the movement of a tracked object—as described in more detail below), the recording initiation component 130 may provide a recording decision to the camera control component 140 indicating that recording of video is to be initiated. In some implementations, the camera control component 140 may be an application that controls overall operations of the camera 102 and, as such, may receive periodic updates from the recording initiation component 130 (e.g., every two seconds) as to whether a decision has been made to initiate recording of video.

As indicated by an arrow 136 in FIG. 1, in response to being notified by the recording initiation component 130 that a decision has been made to initiate recording of video, the camera control component 140 may instruct the recording subsystem 120 to initiate recording of video. The recording subsystem 120 may initiate the recording of video, for example, by causing video frames that have been temporarily stored in a pre-roll buffer of the recording subsystem 120 to be streamed to the datastore(s) 124 and sending an indication to a controller of the datastore(s) 124 to begin recording video for an event. Example implementations of the recording subsystem 120 and recording initiation component 130 are described further below in connection with FIGS. 2 and 3, respectively.

Still referring to FIG. 1, in some implementations, the monitoring service 106 may include, among other components, an image processing component 122 and one or more datastores 124. The datastore(s) 124 may correspond, for example, to the location data store 1002 and/or the image data store 1004 described below in connection with FIG. 10. As indicated by an arrow 138, in some implementations, the recording subsystem 120 may initiate the recording of video within the datastore(s) 124 (e.g., within the image data store 1004) by sending an event indicator to a controller of the datastore(s) 124 and beginning to stream to-be-recorded video to the datastore(s) 124.

As illustrated in FIG. 1, the monitoring device 110 may include, among other thing, a monitoring application 126 (e.g., executing on one or more processors of the monitoring device 110 or accessed as a web application via a browser of the monitoring device 110). Further, as also illustrated, the endpoint device 114 may include, among other things, a user application 128 (e.g., executing on one or more processors of the endpoint device 114 or accessed as a web application via a browser of the endpoint device 114). As shown, the image processing component 122, the monitoring application 126, and the user application 128 may all be in communication with the datastore(s) 124, e.g., via one or more networks such as the network 620 described below in connection with FIGS. 6 and 10. In some implementations, the monitoring service 106 or another component within the surveillance center environment 626 (see FIGS. 6 and 10) may provide one or more application programming interfaces (APIs) that can be used by the image processing component 122, the monitoring application 126, and the user application 128 to write data to the datastore(s) 124 and/or fetch data (including recorded video for respective events) from the datastore(s) 124, as needed.

After video has been recorded in the datastore(s) 124, it may be accessed and used by the various components of the security system 100. For instance, as indicated by an arrow 144 in FIG. 1, recorded video may be accessed and processed by the image processing component 122 (e.g., using one or more image processing modules (e.g., machine learning (ML) models and/or other CV processing components) configured to identify respective features within the recorded image frames. As indicated by an arrow 146, in some implementations, upon identifying one or more features of interest, the image processing component 122 may write data to the datastore(s) 124 indicative of the identified feature(s). As another example, as indicated by an arrow 148, recorded video may be provided to a monitoring application 126 and displayed on a screen of a monitoring device 110 to enable a monitoring agent 112 to review the video to determine whether it presents a potential security concern for a user 116. As indicated by an arrow 150, in some implementations, upon determining that the video presents a potential security concern, the monitoring application 126 may cause a notification of an event of interest to be sent to a user application 128 for display on a screen of an endpoint device 114 for review by the user 116. As still another example, as indicated by an arrow 152, recorded video may be accessed by a user application 128 and presented on a screen of an endpoint device 114 for review by a user 116.

Example implementations of the recording subsystem 120 and the recording initiation component 130 will now be described. As indicated by an arrow 142 in FIG. 1, the image sensor 118 may acquire image data (e.g., digital data representing one or more acquired frames of pixel values) representing a field of view of the camera 102 and pass that image data to the recording subsystem 120 for processing.

Figure 2:
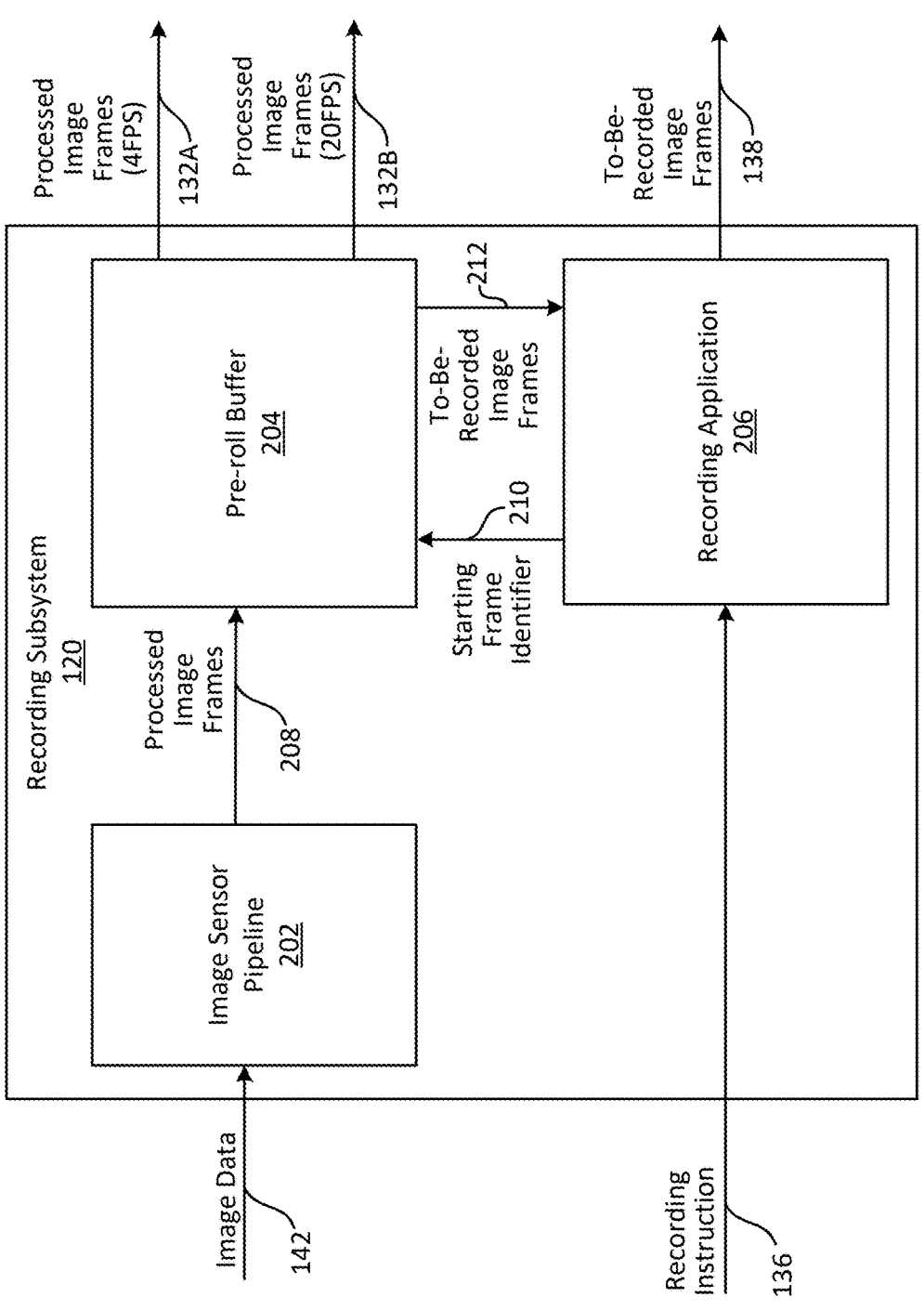
FIG. 2 shows an example implementation of the recording subsystem shown in FIG. 1, in accordance with some embodiments of the present disclosure.

As shown in FIG. 2, in some implementations, the recording subsystem 120 may include an image sensor pipeline 202, a pre-roll buffer 204, and a recording application 206. As indicated by the arrow 142 in FIGS. 1 and 2, the image data received from the image sensor 118 may enter the image sensor pipeline 202 where it may be processed in various ways, such as by performing image quality adjustment, etc., to generate processed image frames (e.g., as indicated by an arrow 208 in FIG. 2). In one example implementation, the image sensor pipeline 202 may output processed image frames at a rate of twenty frames per second. The processed image frames may then be passed to a pre-roll buffer 204. The pre-roll buffer 204 may be configured to temporarily hold frames of image data representing video for a finite time period, e.g., up to twenty-five seconds of video.

Figure 3:
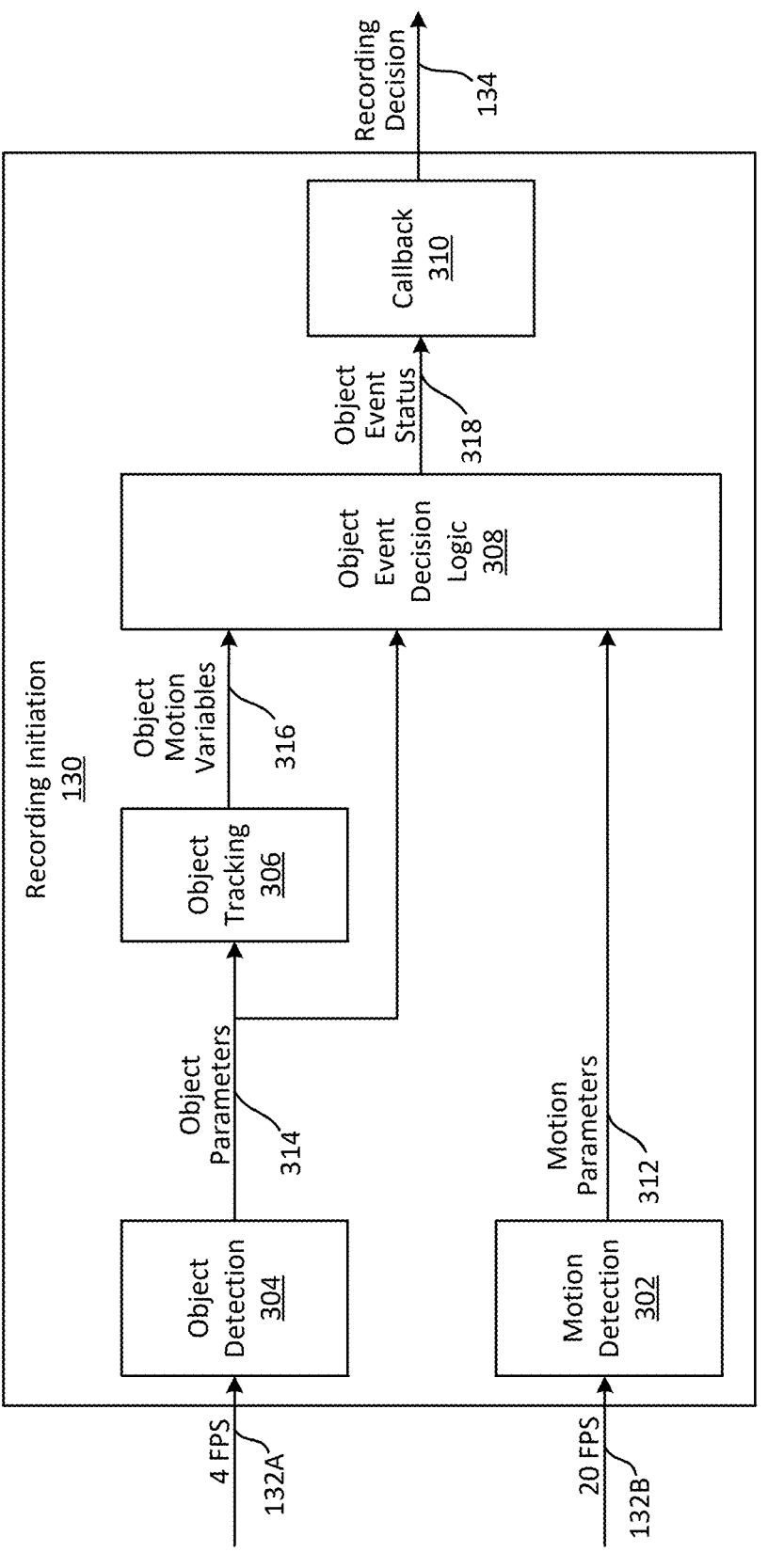
FIG. 3 shows an example implementation of the recording initiation component shown in FIG. 1, in accordance with some embodiments of the present disclosure.

As shown in FIG. 3, in some implementations, the recording initiation component 130 may include a motion detection component 302, an object detection component 304, an object tracking component 306, object event decision logic 308, and a callback component 310. As indicated by the arrows 132A and 132B in FIGS. 2 and 3, in some implementations, processed image frames may be passed from the pre-roll buffer 204 to the motion detection component 302 and the object detection component 304 at different frame rates. In the illustrated example, for instance, the motion detection component 302 receives processed image frames at a rate of twenty frames per second (e.g., receiving every processed image frame output by the image sensor pipeline 202) and the object detection component 304 receives processed image frames at a rate of four frames per second (e.g., receiving only every fifth processed image frame output by the image sensor pipeline 202).

The motion detection component 302 may include one or more CV processing components configured to identify changes in pixel data between consecutive frames. As indicated by an arrow 312 in FIG. 3, in some implementations, the motion detection component 302 may output parameters indicative of the motion it detects, e.g., parameters identifying a bounding box surrounding the area of the consecutive frames in which motion was detected. Example processes that may be performed by the motion detection component 302 to generate suitable motion parameters are described in U.S. Pat. No. 12,119,940, the entire contents of which are incorporated herein by reference. The parameters output by the motion detection component 302 may represent, for example, the coordinates (x, y) of the top-left corner, the width, and the height of a rectangular bounding box surrounding the region of detected motion.

The object detection component 304 may include one or more machine learning (ML) models and/or other CV processing components configured to detect particular objects (e.g., people, pets, packages, vehicles, etc.) in image frames. In some implementations, for example, the object detection component 304 may be implemented using a You Only Look Once (YOLO) model. As indicated by an arrow 314 in FIG. 3, in some implementations, the object detection component 304 may output parameters indicative of a detected object, e.g., identifying bounding boxes surrounding any detected object(s) in individual image frames. Such parameters may include, for example, one or more of the following parameters of a bounding box surrounding a detected object:

Center Coordinates (x, y): These parameters represent the x and y coordinates of the center of a rectangular bounding box. In YOLO, these are often normalized relative to the grid cell responsible for predicting the object, and then further scaled by the image dimensions for the final output.

Width (w): This parameter represents the width of the bounding box, often normalized by the image width.

Height (h): This parameter represents the height of the bounding box, often normalized by the image height.

Confidence Score (pc): This parameter indicates the probability that an object exists within the bounding box and how accurate the predicted box is. If no object is present, this score should be close to zero. If an object is present, it often reflects the Intersection over Union (IoU) between the predicted box and the ground-truth box.

Class Probabilities (c_i): For each bounding box, YOLO also predicts the conditional probability of each possible object class, given that an object is present within that box.

The object tracking component 306 may receive and process the object parameters (e.g., one or more bounding box parameters) output by the object detection component 304 to track the movement of individual objects detected in the processed image frames analyzed by the object detection component 304. In some implementations, the object tracking component 306 may employ a Kalman filter-based process to predict and track object positions, shapes, and motion characteristics through sequential image frames. The object tracking component 306 may, for example, calculate one or more variables for a tracked object, such as its current speed, velocity, scale change (how its size changes), and detection confidence. In some implementations, the variables determined by the Kalman filter may include:

cx, cy: The center coordinates (horizontal and vertical) of the object's bounding box (the rectangle drawn around the detected object).

size: The area of the bounding box (width multiplied by height).

aspect ratio: The ratio of the bounding box's width to its height.

dx, dy: The speed of the bounding box's movement in the horizontal (x) and vertical (y) directions.

dsize: The rate at which the bounding box's size is changing (e.g., if the object is moving closer or further away).

In some implementations, the object tracking component 306 may also use the data from the Kalman filter to compute one or more other variables that can be used by downstream decision logic to determine whether to initiate video recording. For instance, in some implementations, the object tracking component 306 may use the data from the Kalman filter to compute (i) a "total distance traveled" variable, (ii) a "total displacement" variable, and/or (iii) the "aggregate velocity" variable. The "total distance traveled" variable may indicate, for example, the total distance an object has moved since it was first detected. This parameter may be updated for an individual frame by adding the distance moved in the current frame to the previously accumulated distance. The "total displacement" variable may indicate, for example, the straight-line distance between the object's current position and its initial position when first detected. The "aggregate velocity" variable may indicate, for example, a cumulative measure of the object's movement intensity. For example, in some implementations, the object tracking component 306 may compute the aggregate velocity variable by summing the weighted squared values of dx, dy, and dsize over the tracking period. The following equation may be used for this purpose:

$$\text{current aggregate velocity} =$$
$$\text{previous aggregate velocity} + \sqrt{(\alpha * dx^2 + \beta * dy^2 + \gamma * dsize^2)},$$

where the constants $\alpha$ (alpha), $\beta$ (beta), and $\gamma$ (gamma) are weighting factors that may be adjusted to give more or less importance to motion in the x-direction, y-direction, and change in size, respectively.

In some implementations, feedback concerning the accuracy of recordings, e.g., whether the recordings are of actual events of interest, from monitoring agents 112 and/or users

116 can be collected and used to tune the operations performed by the recording initiation component 130, e.g., by adjusting one or more of the above constants, to more accurately identify motion events including objects of interest. Further, in some implementations, the "total distance traveled" and "total displacement" variables can be recorded, e.g., in a memory included in or otherwise associated with the camera 102, and used to improve the logic employed by the object event decision logic 308 for detecting people or other objects of interest.

As indicated by an arrow 316 in FIG. 3, in some implementations, one or more of the foregoing variables computed by the object tracking component 306 and/or some or all of the variables calculated by the Kalman filter may be passed (as "object motion variables") to the object event decision logic 308 for evaluation to determine whether such variables satisfy one or more criteria for determining that recording of video acquired by the camera 102 should be initiated. As shown in FIG. 3, in some implementations, the object event decision logic 308 may additionally receive the object parameters determined by the object detection component 304 and/or the motion parameters determined by the motion detection component 302, and may additionally or alternatively take those parameters into account in reaching its decision about whether to initiate video recording.

The object event decision logic 308 may evaluate the variables/parameters it receives from the motion detection component 302, the object detection component 304, and/or the object tracking component 306 in any of numerous ways and may determine to initiate video recording based on the received variables/parameters meeting any of a number of different criteria. In some implementations, for example, the object event decision logic 308 may evaluate one or more received variables/parameters against one or more corresponding thresholds and determine to initiate video recording based at least in part on the received variable(s)/parameter(s) satisfying such threshold(s). In some implementations, different criteria may be used to evaluate different types of objects (e.g., people, pets, packages, vehicles, etc.) detected by the object detection component 304.

As one example, in some implementations, the object event decision logic 308 may evaluate whether the "aggregate velocity" variable determined by the object tracking component 306 exceeds a first threshold value (e.g., by comparing the current value of the "aggregate velocity" variable with the first threshold value), and may determine to initiate video recording based at least in part on that variable exceeding the first threshold value. As another example, the object event decision logic 308 may additionally or alternatively evaluate whether the "total distance traveled" variable determined by the object tracking component 306 exceeds a second threshold value (e.g., by comparing the current value of the "total distance traveled" variable with the second threshold value), and may determine to initiate video recording based at least in part on that variable exceeding the second threshold value. As still another example, the object event decision logic 308 may additionally or alternatively evaluate whether the "total displacement" variable determined by the object tracking component 306 exceeds a third threshold value (e.g., by comparing the current value of the "total displacement" variable with the third threshold value), and may determine to initiate video recording based at least in part on that variable exceeding the third threshold value. Moreover, in some implementations, the object event decision logic 308 may determine to initiate video recording based at least in part on two or more different variables simultaneously exceed their corresponding thresholds or based on the received variables/parameters meeting any other suitable criteria.

In implementations in which the object event decision logic 308 also receives motion parameters and object parameters from the motion detection component 302 and the object detection component 304, respectively, the object event decision logic 308 may additionally or alternatively determine whether such parameters meet one or more criteria. For instance, in such implementations, the object event decision logic 308 may determine whether a bounding box of a detected object overlaps a bounding box for a detected motion by more than a threshold amount/degree, and may determine to initiate video recording based at least in part on a determination that the amount/degree of overlap exceeds a threshold. Additionally or alternatively, in some implementations, the object event decision logic 308 may evaluate the confidence score (pc) for a detected object across multiple frames (e.g., based on the confidence score (pc) values output by a YOLO model of the object detection component 304 for individual frames) and determine the maximum confidence score produced for such detections (e.g., by identifying the highest confidence score (pc) that has been determined since the object was first detected). In such implementations, the object event decision logic 308 may determine to initiate video recording based at least in part on the maximum confidence score exceeding a threshold value (e.g., by comparing the current value of the maximum confidence score with the threshold value). Further in some implementations, the object event decision logic 308 may additionally or alternatively determine the sum of all confidence scores for an object throughout its tracking period to determine an aggregate confidence score, and may determine to initiate video recording based at least in part on the aggregate confidence score exceeding a threshold value. The use of such an aggregate confidence score as a metric may, for instance, balance the quality (high individual confidence scores) and quantity (number of times detected) of detections. For example, an object detected many times with low confidence might still trigger recording if the sum is high enough, similar to an object detected fewer times but with high confidence.

Again, it should be appreciated that the foregoing possibilities are but a few examples of the numerous ways in which the variables/parameter received from upstream components may be evaluated by the object event decision logic 308 to determine whether to initiate video recording. The determination as to precisely which variables/parameters (or combinations of variables/parameters) need to satisfy which thresholds or other criteria for which types of detected objects, and in what combinations, in order for the object event decision logic 308 to determine to initiate video recording can be adjusted and optimized in any of numerous ways to maximize the performance and accuracy of the decision made by the object event decision logic 308.

In any event, as indicated by an arrow 318 in FIG. 3, the object event decision logic 308 may output data (e.g., status data) indicating a determination as to whether, for individual frames of image data, the one or more criteria for determining to initiate video recording have been satisfied. In some implementations, such data may be accumulated by the callback component 310 and the callback component 310 may communicate such data, or a summary of it, for a particular reporting period (e.g., two seconds) to the camera control component 140 in the form of a recording decision (as indicated by the arrow 134). In some implementations, the recording decision may not only indicate whether or not video recording is to be initiated, but may also include an identifier of a particular frame (e.g., a "starting frame identifier") for which the one or more criteria were first satisfied during the current reporting period.

As indicated by the arrow 136 in FIGS. 1 and 2, in response to receiving a decision (e.g., reporting decision) including an indication that video recording is to be initiated, the camera control component 140 may provide an instruction (e.g., a recording instruction) to the recording application 206 of the recording subsystem 120 to initiate recording of video beginning at frame identified by the starting frame. In response to such an instruction, as indicated by arrows 210 and 212 in FIG. 2, the recording application 206 may retrieve buffered video frames from the pre-roll buffer 204 and begin streaming those frames to the datastore(s) 124, as indicated by the arrow 138 in FIGS. 1 and 2.

Figure 4:
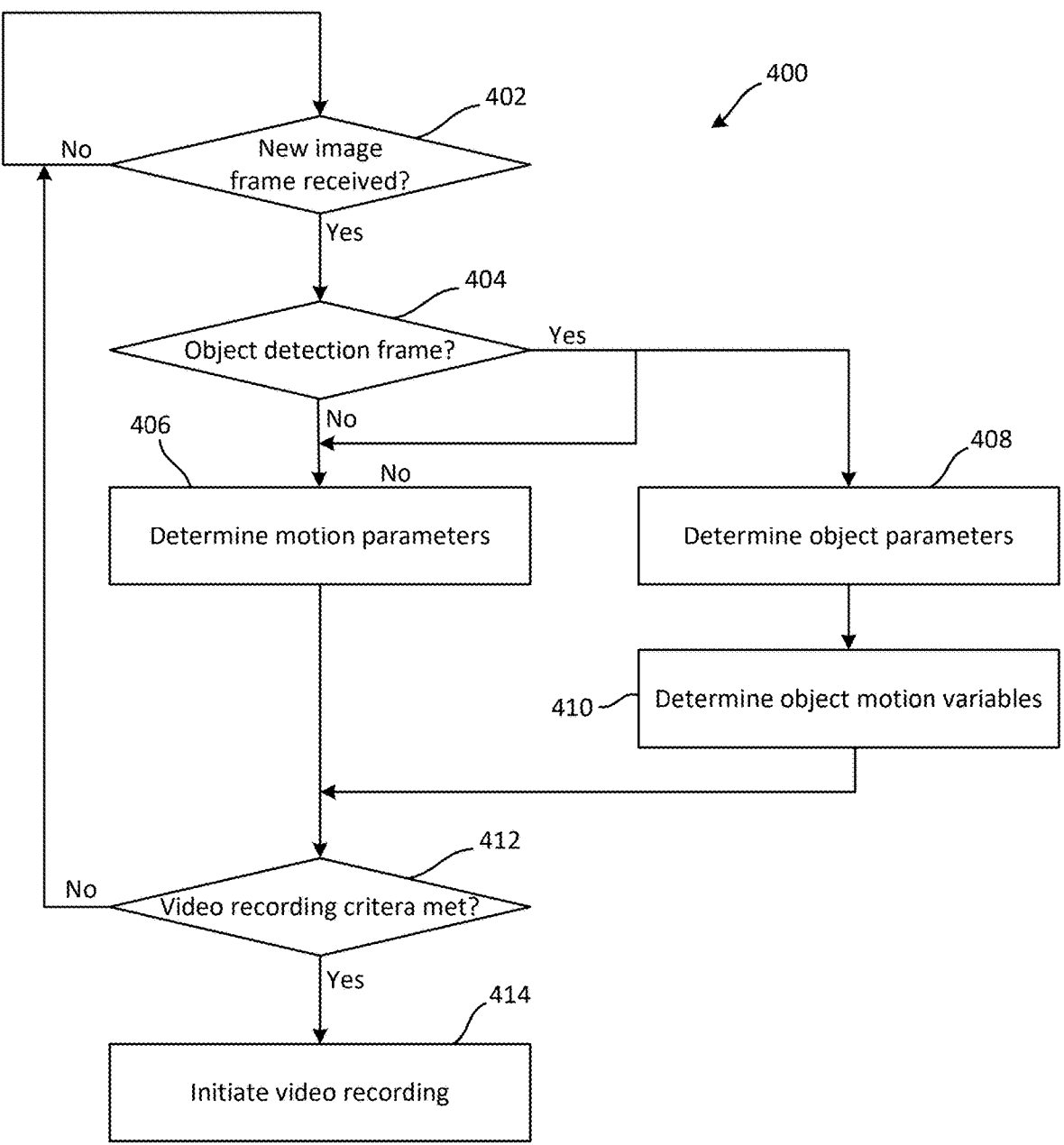
FIG. 4 shows an example routine that may be performed by the recording initiation component shown in FIGS. 1 and 3, in accordance with some embodiments of the present disclosure.

FIG. 4 shows an example routine 400 that may be executed by the recording initiation component 130 (shown in FIG. 3). As noted above, in some implementations, the various sub-components of the recording initiation component 130 (e.g., the motion detection component 302, the object detection component 304, the object tracking component 306, the object event decision logic 308 and the callback component 310) may be implemented by one or more processors (e.g., processor 902 shown in FIG. 9) executing machine-readable instructions stored in one or more computer readable media (e.g., volatile memory 904 and/or non-volatile memory 908 shown in FIG. 9).

At a decision 402 of the routine 400, the recording initiation component 130 may determine whether a new image frame has been received, e.g., from the pre-roll buffer 204 of the recording subsystem 120) for processing. Receipt of a new image frame (per the decision 402) may correspond, for example, to the motion detection component 302 obtaining a single image frame from the pre-roll buffer 204 as the recording initiation component 130 is retrieving processed image frames from the pre-roll buffer 204 at a rate of twenty frames per second, e.g., as indicated by the arrow 132B in FIGS. 2 and 3.

When, at the decision 402, the recording initiation component 130 determines that a new image frame has been received, the recording initiation component 130 may proceed to a decision 404, at which the recording initiation component 130 may determine whether the received frame is to be subjected to object detection (e.g., via the object detection component 304) in addition to be subjected to motion detection (e.g., via the motion detection component 302). For example, as noted above, in some implementations, all received frames may be subjected to motion detection whereas only a subset of received frames (e.g., every fifth frame) may be subjected to object detection. The identification of an image frame that is to be subject to object detection (per the decision 404) may correspond, for example, to the recording initiation component 130 counting the individual image frames that are retrieved from the pre-roll buffer 204 for processing by the motion detection component 302 (e.g., at a rate of twenty frames per second) and determining that a particular processed image frame is to be subjected to object detection processing (e.g., by the object detection component 304) if the current count is a multiple of five), thus presenting processed image frames to the 304 at a rate of four frames per second, e.g., as indicated by the arrow 132A in FIGS. 2 and 3. Any of a number of other schemes may likewise be used to cause the motion detection component 302 and the object detection component 304 to receive processed image frames (e.g., from the pre-roll buffer 204) at appropriate sample rates.

As indicated, when, at the decision 404, the recording initiation component 130 determines that the received frame is to be subjected to objection detection (i.e., "Yes"), the routine 400 may proceed both to (A) a step 406, at which one or more sub-components of the recording initiation component 130 (e.g., the motion detection component 302) may perform motion detection, and (B) a step 408, at which one or more components of the recording initiation component 130 (e.g., the object detection component 304) may perform object detection. When, on the other hand, the recording initiation component 130 determines (at the decision 404) that the received frame is not to be subjected to objection detection (i.e., "No"), the routine 400 may proceed only to the step 406, at which one or more subcomponents of the recording initiation component 130 (e.g., the motion detection component 302) may perform motion detection. Examples of motion parameters and object parameters that may be generated by the motion detection component 302 and the object detection component 304, respectively, in response to detecting motion and objects are described above.

Following the step 408, the routine 400 may proceed to a step 410, at which one or more subcomponents of the recording initiation component 130 (e.g., the object tracking component 306) may process the object parameters determined at the step 408 (e.g., using Kalman filter-based processing of object parameters from every fifth image frame, as described above) to determine one or more object motion variables. Examples of object motion variable (e.g., aggregate velocity, total distance traveled, total displacement etc.) that may be generated by the object tracking component 306 based on the object parameters output by the object detection component 304 are described above.

At a decision 412 of the routine 400, one or more subcomponents of the recording initiation component 130 (e.g., the object event decision logic 308) may determine whether the motion parameters, object parameters, and/or object motion variables determined at the steps 406, 408, and 410, respectively, satisfy one or more criteria for initiating recording of video. In one example implementation, for instance, the object event decision logic 308 may determine that recording of video is to be initiated only if: (A) the current value of "aggregate velocity" variable exceeds a first threshold value, (B) the current value of the "total distance traveled" variable exceeds a second threshold value, (C) the current value of the "total displacement" variable exceeds a third threshold value, (D) the amount of overlap between the bounding box of the detected object (e.g., as defined by parameters output by a YOLO model) and the bounding box of detected motion (e.g., as defined by parameters output by the motion detection component 302) exceeds a fourth threshold value, and (E) the maximum confidence score that a particular object (e.g., a person) has been detected exceeds a fifth threshold value. Any of a number of different and/or additional criteria, and/or combinations of criteria, may additionally or alternatively be employed by the object event decision logic 308.

When, at the decision 412, the object event decision logic 308 determines that the one or more criteria for recording video are satisfied (e.g., by determining that the "aggregate velocity" variable, the "total distance traveled" variable, the "total displacement" variable," the amount of bounding box overlap, and/or the maximum object detection confidence exceed respective threshold values, as described above), the routine 400 may proceed to a step 414, at which one or more subcomponents of the recording initiation component 130 (e.g., the callback component 310) may initiate the recording of video from the camera 102 (e.g., by communicating a positive recording decision to the camera control component 140 during a callback operation, as described above). For instance, in some implementations, the camera control component 140 (shown in FIG. 1) may subscribe to receive periodic updates (e.g., every two seconds) from the callback component 310, and the callback component 310 may periodically provide a summary of the object event status indications received from the object event decision logic 308 (see the arrow 318 in FIG. 3) over the preceding two second period to the recording initiation component 130. Such a summary may indicate, for example (A) whether any positive object event status (e.g., based on various criteria being satisfied, as described above) was identified during the reporting interval, and (B) an identification of the particular image frame for which the positive object event status was first identified during the interval (e.g., as a starting frame identifier 210 that the recording application 206 can use to begin reading image frames from the pre-roll buffer 204, per the arrow 210 in FIG. 2).

When, on the other hand, the object event decision logic 308 determines that the one or more criteria for recording video are not satisfied, the routine 400 may instead return to the decision 402, at which the recording initiation component 130 may await receipt of another new image frame.

FIG. 5A shows a first example routine 500 that may be performed by a computing device (e.g., within the camera 102 shown in FIG. 1), in accordance with some embodiments of the present disclosure.

At step 502 of the routine 500, the computing device may determine that a plurality of frames of image data represent an object of a first type (e.g., a person), the plurality of frames including at least first and second frames.

At step 504 of the routine 500, the computing device may determine (e.g., using a YOLO model) at least first and second parameters (e.g., respective coordinates) indicative of first and second positions of a bounding box of the object (e.g., the person) within the first and second frames, respectively.

At step 506 of the routine 500, the computing device may calculate (e.g., using Kalman Filter), using at least the first parameter and the second parameter, at least a first rate at which a position of the bounding box is moving from frame to frame within the plurality of frames.

At step 508 of the routine 500, the computing device may determine a variable (e.g., an aggregate velocity) that is based at least in part on the at least one first rate.

At step 510 of the routine 500, the computing device may determine (e.g., using the object event decision logic 308) that the variable satisfies a first criterion.

At step 512 of the routine 500, the computing device may cause, based at least in part on the variable satisfying the first criterion, acquired video to be recorded in a datastore, e.g., by using the recording subsystem 120 to stream to-be-recorded frames of video data to the datastore(s) 124.

FIG. 5B shows a second example routine 520 that may be performed by a computing device (e.g., within the camera 102 shown in FIG. 1), in accordance with some embodiments of the present disclosure.

At step 522 of the routine 520, the computing device may determine that a plurality of frames of image data represent an object of a first type (e.g., a person), the plurality of frames including at least first and second frames.

At step 524 of the routine 520, the computing device may determine (e.g., using a YOLO model) at least first and second parameters (e.g., respective width and height values) indicative of first and second sizes of a bounding box of the object within the first and second frames, respectively.

At step 526 of the routine 520, the computing device may determine (e.g., using a Kalman filter), using at least the first parameter and the second parameter, at least one rate at which a size of the bounding box is changing from frame to frame within the plurality of frames.

At step 528 of the routine 520, the computing device may determine a variable (e.g., an aggregate velocity) that is based at least in part on the at least one rate.

At step 530 of the routine 520, the computing device may determine (e.g., using the object event decision logic 308) that the variable satisfies a first criterion.

At step 532 of the routine 520, the computing device may cause, based at least in part on the variable satisfying the first criterion, acquired video to be recorded in a datastore, e.g., by using the recording subsystem 120 to stream to-be-recorded frames of video data to the datastore(s) 124

FIG. 6 is a schematic diagram of an example security system 600 with which various aspects of the present disclosure may be employed. As shown, in some implementations, the security system 600 may include a plurality of monitored locations 104 (only one of which is illustrated in FIG. 6), a monitoring center environment 622, a surveillance center environment 626, one or more endpoint devices 114, and one or more communication networks 620. The monitored location 104, the monitoring center environment 622, the surveillance center environment 626, the one or more endpoint device(s) 114, and the communication network(s) 620 may each include one or more computing devices (e.g., as described below with reference to FIG. 12). The endpoint device(s) 114 may include one or more user applications 128, e.g., as applications hosted on or otherwise accessible by the endpoint device(s) 114. In some implementations, the user applications 128 may be embodied as web applications that can be accessed via browsers of the endpoint device(s) 114. The monitoring center environment 622 may include one or more monitoring applications 126, e.g., as applications hosted on or otherwise accessible by one or more computing devices within the monitoring center environment 622. In some implementations, the monitoring applications 126 may be embodied as web applications that can be accessed via browsers of computing devices operated by monitoring agents 112 within the monitoring center environment 622. The surveillance center environment 626 may include a surveillance service 630 and one or more transport services 628.

As shown in FIG. 6, the monitored location 104 may include one or more image capture devices (e.g., cameras 102A and 102B), one or more contact sensor assemblies (e.g., contact sensor assembly 606), one or more keypads (e.g., keypad 608), one or more motion sensor assemblies (e.g., motion sensor assembly 610), a base station 612, and a router 614. As illustrated, the base station 612 may host a surveillance client 616.

In some implementations, the router 614 may be a wireless router that is configured to communicate with the devices disposed at the monitored location 104 (e.g., devices 102A, 102B, 606, 608, 610, and 612) via communications that comport with a communications standard such as any of the various Institute of Electrical and Electronics Engineers (IEEE) 108.11 standards. As illustrated in FIG. 6, the router 614 may also be configured to communicate with the network(s) 620. In some implementations, the router 614 may implement a local area network (LAN) within and proximate to the monitored location 104. In other implementations, other types of networking technologies may additionally or alternatively be used within the monitored location 104. For instance, in some implementations, the base station 612 may receive and forward communication packets transmitted by one or both of the cameras 102A, 102B via a point-to-point personal area network (PAN) protocol, such as BLUETOOTH. Other suitable wired, wireless, and mesh network technologies and topologies will be apparent with the benefit of this disclosure and are intended to fall within the scope of the examples disclosed herein.

The network(s) 620 may include one or more public and/or private networks that support, for example, internet protocol (IP) communications. The network(s) 620 may include, for example, one or more LANs, one or more PANs, and/or one or more wide area networks (WANs). LANs that may be employed include wired or wireless networks that support various LAN standards, such as a version of IEEE 108.11 or the like. PANs that may be employed include wired or wireless networks that support various PAN standards, such as BLUETOOTH, ZIGBEE, or the like. WANs that may be employed include wired or wireless networks that support various WAN standards, such as Code Division Multiple Access (CMDA), Global System for Mobiles (GSM), or the like. Regardless of the particular networking technology that is employed, the network(s) 620 may connect and enable data communication among the components within the monitored location 104, the monitoring center environment 622, the surveillance center environment 626, and the endpoint device(s) 114. In at least some implementations, both the monitoring center environment 622 and the surveillance center environment 626 may include networking components (e.g., similar to the router 614) that are configured to communicate with the network(s) 620 and various computing devices within those environments.

The surveillance center environment 626 may include physical space, communications, cooling, and power infrastructure to support networked operation of a large number of computing devices. For instance, the infrastructure of the surveillance center environment 626 may include rack space into which the computing devices may be installed, uninterruptible power supplies, cooling plenum and equipment, and networking devices. The surveillance center environment 626 may be dedicated to the security system 600, may be a non-dedicated, commercially available cloud computing service (e.g., MICROSOFT AZURE, AMAZON WEB SERVICES, GOOGLE CLOUD, or the like), or may include a hybrid configuration made up of both dedicated and non-dedicated resources. Regardless of its physical or logical configuration, as shown in FIG. 6, the surveillance center environment 626 may be configured to host the surveillance service 630 and the transport service(s) 628.

The monitoring center environment 622 may include a plurality of computing devices (e.g., desktop computers) and network equipment (e.g., one or more routers) that enable communication between the computing devices and the network(s) 620. The endpoint device(s) 114 may each include a personal computing device (e.g., a desktop computer, laptop, tablet, smartphone, or the like) and network equipment (e.g., a router, cellular modem, cellular radio, or the like). As illustrated in FIG. 6, the monitoring center environment 622 may be configured to host the monitoring application(s) 126 and the endpoint device(s) 114 may be configured to host the user application(s) 128.

The devices 102A, 102B, 606, and 610 may be configured to acquire analog signals via sensors incorporated into the devices, generate digital sensor data based on the acquired signals, and communicate (e.g., via a wireless link with the router 614) the sensor data to the base station 612. The types of sensor data generated and communicated by these devices may vary depending on the characteristics of the sensors they include. For instance, the cameras 102A and 102B may acquire ambient light, generate one or more frames of image data based on the acquired light, and communicate the frame(s) to the base station 612, although the pixel resolution and frame rate may vary depending on the capabilities of the devices. In some implementations, the cameras 102A and 102B may also receive and store filter zone configuration data and filter the frame(s) using one or more filter zones (e.g., areas within the FOV of a camera from which image data is to be redacted for various reasons, such as to exclude a tree that is likely to generate a false positive motion detection result on a windy day) prior to communicating the frame(s) to the base station 612. In the example shown in FIG. 6, the camera 102A has a field of view (FOV) that originates proximal to a front door of the monitored location 104 and can acquire images of a walkway 638, a road 64A0, and a space between the monitored location 104 and the road 64A0. The camera 102B, on the other hand, has an FOV that originates proximal to a bathroom of the monitored location 104 and can acquire images of a living room and dining area of the monitored location 104. The camera 102B may further acquire images of outdoor areas beyond the monitored location 104, e.g., through windows 618A and 618B on the right-hand side of the monitored location 104.

Individual contact sensor assemblies deployed at the monitored location 104, e.g., the contact sensor assembly 606 shown in FIG. 6, may include, for example, a sensor that can detect the presence of a magnetic field generated by a magnet when the magnet is proximal to the sensor. When the magnetic field is present, the contact sensor assembly 606 may generate Boolean sensor data specifying a closed state of a window, door, etc. When the magnetic field is absent, the contact sensor assembly 606 may instead generate Boolean sensor data specifying an open state of the window, door, etc. In either case, the contact sensor assembly 606 shown in FIG. 6 may communicate sensor data indicating whether the front door of the monitored location 104 is open or closed to the base station 612.

Individual motion sensor assemblies that are deployed at the monitored location 104, e.g., the motion sensor assembly 610 shown in FIG. 6, may include, for example, a component that can emit high-frequency pressure waves (e.g., ultrasonic waves) and a sensor that can acquire reflections of the emitted waves. When the sensor detects a change in the reflected pressure waves, e.g., because one or more objects are moving within the space monitored by the sensor, the motion sensor assembly 610 may generate Boolean sensor data specifying an alert state. When the sensor does not detect a change in the reflected pressure waves, e.g., because no objects are moving within the monitored space, the motion sensor assembly 610 may instead generate Boolean sensor data specifying a still state. In either case, the motion sensor assembly 610 may communicate the sensor data to the base station 612. It should be noted that the specific sensing modalities described above are not limiting to the present disclosure. For instance, as but one example of an alternative implementation, the motion sensor assembly 610 may instead (or additionally) base its operation on the detection of changes in reflected electromagnetic waves.

While particular types sensors are described above, it should be appreciated that other types of sensors may additionally or alternatively be employed within the monitored location 104 to detect the presence and/or movement of humans, or other conditions of interest, such as smoke, elevated carbon dioxide levels, water accumulation, etc., and to communicate data indicative of such conditions to the base station 612. For instance, although not illustrated in FIG. 6, in some implementations, one or more sensors may be employed to detect sudden changes in a measured temperature, sudden changes in incident infrared radiation, sudden changes in incident pressure waves (e.g., sound waves), etc. Still further, in some implementations, some such sensors and/or the base station 612 may additionally or alternatively be configured to identify particular signal profiles indicative of particular conditions, such as sound profiles indicative of breaking glass, footsteps, coughing, etc.

The keypad 608 shown in FIG. 6 may be configured to interact with a user and interoperate with the other devices disposed in the monitored location 104 in response to such interactions. For instance, in some examples, the keypad 608 may be configured to receive input from a user that specifies one or more commands and to communicate the specified commands to one or more addressed devices and/or processes, e.g., one or more of the devices disposed in the monitored location 104, the monitoring application(s) 126, and/or the surveillance service 630. The communicated commands may include, for example, codes that authenticate the user as a resident of the monitored location 104 and/or codes that request activation or deactivation of one or more of the devices disposed in the monitored location 104. In some implementations, the keypad 608 may include a user interface (e.g., a tactile interface, such as a set of physical buttons or a set of "soft" buttons on a touchscreen) configured to interact with a user (e.g., receive input from and/or render output to the user). Further, in some implementations, the keypad 608 may receive responses to the communicated commands and render such responses via the user interface as visual or audio output.

The base station 612 shown in FIG. 6 may be configured to interoperate with other security system devices disposed at the monitored location 104 to provide local command and control and/or store-and-forward functionality via execution of the surveillance client 616. To implement local command and control functionality, the base station 612 may execute a variety of programmatic operations through execution of the surveillance client 616 in response to various events. Examples of such events include reception of commands from the keypad 608, reception of commands from one of the monitoring application(s) 126 or the user application 128 via the network(s) 620, and detection of the occurrence of a scheduled event. The programmatic operations executed by the base station 612 via execution of the surveillance client 616 in response to events may include, for example, activation or deactivation of one or more of the devices 102A, 102B, 606, 608, and 610; sounding of an alarm; reporting an event to the surveillance service 630; and/or communicating "location data" to one or more of the transport service(s) 628. Such location data may include, for example, data specifying sensor readings (sensor data), image data acquired by one or more cameras 102, configuration data of one or more of the devices disposed at the monitored location 104, commands input and received from a user (e.g., via the keypad 608 or a user application 128), or data derived from one or more of the foregoing data types (e.g., filtered sensor data, filtered image data, summarizations of sensor data, event data specifying an event detected at the location via the sensor data, etc.).

In some implementations, to implement store-and-forward functionality, the base station 612, through execution of the surveillance client 616, may receive sensor data, package the data for transport, and store the packaged sensor data in local memory for subsequent communication. Such communication of the packaged sensor data may include, for example, transmission of the packaged sensor data as a payload of a message to one or more of the transport service(s) 628 when a communication link to the transport service(s) 628 via the network(s) 620 is operational. In some implementations, such packaging of the sensor data may include filtering the sensor data using one or more filter zones and/or generating one or more summaries (maximum values, average values, changes in values since the previous communication of the same, etc.) of multiple sensor readings.

The transport service(s) 628 of the surveillance center environment 626 may be configured to receive messages from monitored locations (e.g., the monitored location 104), parse the messages to extract payloads included therein, and store the payloads and/or data derived from the payloads within one or more data stores hosted in the surveillance center environment 626. Examples of such data stores are described below in connection with FIG. 10. In some implementations, the transport service(s) 628 may expose and implement one or more application programming interfaces (APIs) that are configured to receive, process, and respond to calls from base stations (e.g., the base station 612) via the network(s) 620. Individual instances of transport service(s) 628 may be associated with and specific to certain manufactures and/or models of location-based monitoring equipment (e.g., SIMPLISAFE equipment, RING equipment, etc.).

The API(s) of the transport service(s) 628 may be implemented using a variety of architectural styles and interoperability standards. For instance, in some implementations, one or more such APIs may include a web services interface implemented using a representational state transfer (REST) architectural style. In such implementations, API calls may be encoded using the Hypertext Transfer Protocol (HTTP) along with JavaScript Object Notation (JSON) and/or an extensible markup language. Such API calls may be addressed to one or more uniform resource locators (URLs) corresponding to API endpoints monitored by the transport service(s) 628. In some implementations, portions of the HTTP communications may be encrypted to increase security. Alternatively (or additionally), in some implementations, one or more APIs of the transport service(s) 628 may be implemented as a .NET web API that responds to HTTP posts to particular URLs. Alternatively (or additionally), in some implementations, one or more APIs of the transport service(s) 628 may be implemented using simple file transfer protocol commands. Thus, the API(s) of the transport service(s) 628 are not limited to any particular implementation.

The surveillance service 630 within the surveillance center environment 626 may be configured to control the overall logical setup and operation of the security system 600. As such, the surveillance service 630 may communicate and interoperate with the transport service(s) 628, the monitoring application(s) 126, the user application(s) 128, and the various devices disposed at the monitored location 104 via the network(s) 620. In some implementations, the surveillance service 630 may be configured to monitor data from a variety of sources for reportable events (e.g., a break-in event) and, when a reportable event is detected, notify one or more of the monitoring applications 126 and/or the user application(s) 128 of the reportable event.

In some implementations, the surveillance service 630 may additionally be configured to maintain state information regarding the monitored location 104. Such state information may indicate, for example, whether the monitored location 104 is safe or under threat. In some implementations, the surveillance service 630 may be configured to change the state information to indicate that the monitored location 104 is safe only upon receipt of a communication indicating a clear event (e.g., rather than making such a change solely due to the lack of additional reportable events being detected). This feature can prevent a "crash and smash" robbery (e.g., where an intruder promptly destroys or disables monitoring equipment) from being successfully executed. In addition, in some implementations, the surveillance service 630 may be configured to monitor one or more particular zones within the monitored location 104, such as one or more particular rooms or other distinct regions within and/or around the monitored location 104 and/or one or more defined regions within the FOVs of the respective image capture devices deployed in the monitored location (e.g., the cameras 102A and 102B shown in FIG. 6).

The individual monitoring application(s) 126 of the monitoring center environment 622 may be configured to enable monitoring personnel to interact with respective computing devices to provide monitoring services for respective locations (e.g., the monitored location 104), and to execute a variety of programmatic operations in response to such interactions. For example, in some implementations, a monitoring application 126 may control its host computing device to provide information regarding reportable events detected at monitored locations, such as the monitored location 104, to a person operating that computing device. Such reportable events may include, for example, detected movement within a particular zone of the monitored location 104. In some implementations, the monitoring application 126 may cause a monitoring device 110 to present video clips of reportable events within individual event windows, and may further establish a streaming connection with one or more cameras 102 at the monitored location and cause the monitoring device 110 to provide streamed video from such camera(s) 102, as well as to allow audio communication between the monitoring device 110 and the camera(s) 102.

The user application(s) 128 of the endpoint device(s) 114 may be configured to enable users to interact with their computing devices (e.g., their smartphones or personal computers) to access various services provided by the security system 600 for their individual homes or other locations (e.g., the monitored location 104), and to execute a variety of programmatic operations in response to such interactions. For example, in some implementations, a user application 128 may control a endpoint device 114 (e.g., a smartphone or personal computer) to provide information regarding reportable events detected at monitored locations, such as the monitored location 104, to the user operating that endpoint device 114. Such reportable events may include, for example, detected movement within a particular zone of the monitored location 104. In some implementations, the user application 128 may additionally or alternatively be configured to process input received from the user to activate or deactivate one or more of the devices disposed within the monitored location 104. Further, as described above in connection with FIG. 3, the user application 128 may additionally or alternatively be configured to establish a streaming connection with one or more cameras 102 at the monitored location and cause the endpoint device 114to display streamed video from such camera(s) 102, as well as to allow audio communication between the endpoint device 114and the camera(s) 102.

Turning now to FIG. 7, an example base station 612 is schematically illustrated. As shown in FIG. 7, the base station 612 may include at least one processor 702, volatile memory 704, non-volatile memory 708, at least one network interface 706, a user interface 714, a battery assembly 716, and an interconnection mechanism 718. The non-volatile memory 708 may store executable code 710 and, as illustrated, may also include a data store 712. In some implementations, the features of the base station 612 enumerated above may be incorporated within, or may otherwise be supported by, a housing 720.

In some implementations, the non-volatile (non-transitory) memory 708 may include one or more read-only memory (ROM) chips; one or more hard disk drives or other magnetic or optical storage media; one or more solid state drives (SSDs), such as a flash drive or other solid-state storage media; and/or one or more hybrid magnetic and SSDs. In some implementations, the code 710 stored in the non-volatile memory may include an operating system and one or more applications or programs that are configured to execute under the control of the operating system. In some implementations, the code 710 may additionally or alternatively include specialized firmware and embedded software that is executable without dependence upon a commercially available operating system. In any event, regardless how the code 710 is embodied, execution of the code 710 may implement the surveillance client 616 shown in FIG. 6 and enable the storage and manipulation of data for the surveillance client 616 within the data store 712.

The processor 702 of the base station 612 may include one or more processors configured to execute instructions encoded within a computer-readable medium, such as a computer program embodied by the code 710, to control the operations of the base station 612. As used herein, the term "processor" describes circuitry that executes a function, an operation, or a sequence of operations. The function, operation, or sequence of operations may be hard coded into the circuitry or soft coded by way of instructions held in a memory device (e.g., the volatile memory 704) and executed by the circuitry. In some implementations, the processor 702 may be embodied by one or more application specific integrated circuits (ASICs), microprocessors, digital signal processors (DSPs), graphics processing units (GPUs), neural processing units (NPUs), microcontrollers, field programmable gate arrays (FPGAs), programmable logic arrays (PLAs), and/or multicore processors.

Prior to executing the code 710, the processor 702 may copy at least a portion of the code 710 from the non-volatile memory 708 to the volatile memory 704. In some implementations, the volatile memory 704 may include one or more static or dynamic random access memory (RAM) chips and/or cache memory (e.g., memory disposed on a silicon die of the processor 702). Volatile memory 704 may offer a faster response time than a main memory, such as the non-volatile memory 708.

Through execution of the code 710, the processor 702 may control operation of the network interface 706. For instance, in some implementations, the network interface 706 may include one or more physical interfaces (e.g., a radio, an ethernet port, a universal serial bus (USB) port, etc.) as well as a software stack including drivers and/or other code 710 that is configured to communicate with the one or more physical interfaces to support one or more LAN, PAN, and/or WAN standard communication protocols. Such communication protocols may include, for example, transmission control protocol (TCP) and user datagram protocol (UDP) among others. As such, the network interface 706 may enable the base station 612 to access and communicate with other computing devices (e.g., the other devices disposed in the monitored location 104 of FIG. 6) via a computer network (e.g., the LAN established by the router 614 of FIG. 6, the network(s) 620 of FIG. 6, and/or a point-to-point connection). For instance, in some implementations, the network interface 706 may utilize sub-GHz wireless networking to transmit wake messages to the other computing devices to request streams of sensor data.

Through execution of the code 710, the processor 702 may additionally control operation of hardware and a software stack including drivers and/or other code 710 that is configured to communicate with other system devices. As such, the base station 612 may interact with other system components in response to received inputs. Such inputs may specify, for example, values that are to be stored in the data store 712. The base station 612 may further provide outputs representing values stored in the data store 712. In some implementations, the base station 612 may additionally include one or more light-emitting diodes (LEDs) or other visual indicators to visually communication information, such as system status or alarm events. Further, in some implementations, the base station 612 may additionally or alternatively include a siren (e.g., a 95 decibel (dB) siren) or other audio output device that may be controlled by the processor 702 to output an audio indication that a break-in event has been detected.

The various components of the base station 612 described above may communicate with one another via the interconnection mechanism 718. In some implementations, the interconnection mechanism 718 may include a communications bus. Further, in some implementations, the battery assembly 716 may be configured to supply operational power to the various features of the base station 612 described above. In some implementations, the battery assembly 716 may include at least one rechargeable battery (e.g., one or more nickel metal hydride (NiMH) or lithium batteries). In some implementations, such a rechargeable battery (or batteries) may have a runtime capacity sufficient to operate the base station 612 for twenty-four hours or longer while the base station 612 is disconnected from or otherwise not receiving line power. In some implementations, the battery assembly 716 may additionally or alternatively include power supply circuitry to receive, condition, and distribute line power to both operate the base station 612 and recharge one or more rechargeable batteries. Such power supply circuitry may include, for example, a transformer and a rectifier, among other circuitry, to convert AC line power to DC device and recharging power.

Turning now to FIG. 8, an example keypad 608 is schematically illustrated. As shown in FIG. 8, the keypad 608 may include at least one processor 802, volatile memory 804, non-volatile memory 808, at least one network interface 806, a user interface 814, a battery assembly 816, and an interconnection mechanism 818. The non-volatile memory 808 may store executable code 810 and, as illustrated, may also include a data store 812. In some implementations, the features of the keypad 608 enumerated above may be incorporated within, or may otherwise be supported by, a housing 820.

In some implementations, the respective descriptions of the processor 702, the volatile memory 704, the non-volatile memory 708, the interconnection mechanism 718, and the battery assembly 716 with reference to the base station 612 are applicable to the processor 802, the volatile memory 804, the non-volatile memory 808, the interconnection mechanism 818, and the battery assembly 816 with reference to the keypad 608. As such, those descriptions will not be repeated here.

Through execution of the code 810, the processor 802 of the keypad 608 may control operation of the network interface 806. In some implementations, the network interface 806 may include one or more physical interfaces (e.g., a radio, an ethernet port, a USB port, etc.) and a software stack including drivers and/or other code 810 that is configured to communicate with the one or more physical interfaces to support one or more LAN, PAN, and/or WAN standard communication protocols. Such communication protocols may include, for example, TCP and UDP, among others. As such, the network interface may 806 enable the keypad 608 to access and communicate with other computing devices (e.g., the other devices disposed in the monitored location 104 of FIG. 6) via a computer network (e.g., the LAN established by the router 614).

Through execution of the code 810, the processor 802 may additionally control operation of the user interface 814. In some implementations, the user interface 814 may include user input and/or output devices (e.g., physical keys arranged as a keypad, a touchscreen, a display, a speaker, a camera, a biometric scanner, an environmental sensor, etc.) and a software stack including drivers and/or other code 810 that is configured to communicate with the user input and/or output devices. As such, the user interface 814 may enable the keypad 608 to interact with users to receive inputs and/or render outputs. Examples of outputs that may be rendered by the user interface 814 include one or more GUIs comprising one or more controls configured to display outputs and/or receive inputs. The inputs received by the user interface 814 may specify, for example, values that are to be stored in the data store 812. The outputs provided by the user interface 814 may further indicate values stored in the data store 812. In some implementations, parts of the user interface 814 (e.g., one or more LEDs) may be accessible and/or visible as part of, or through, the housing 820.

Figure 9:
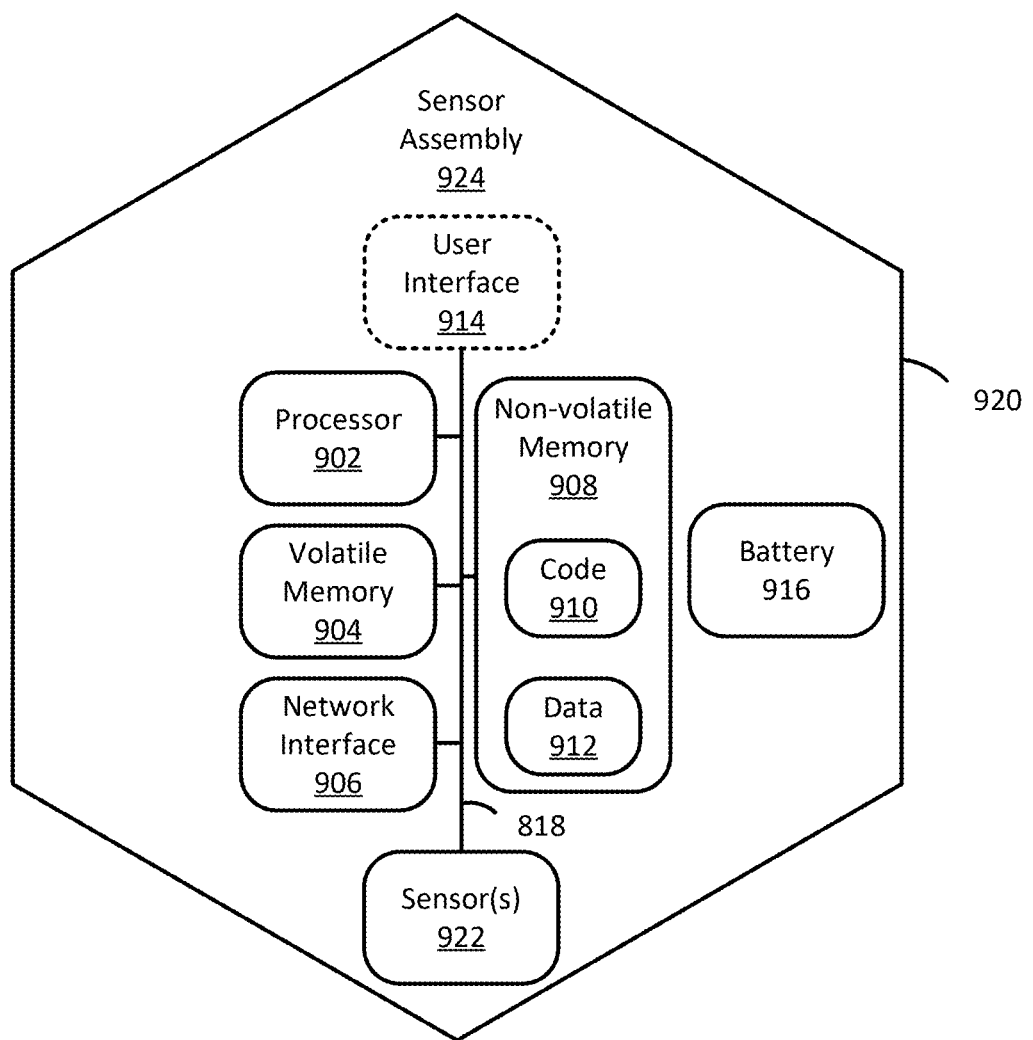
FIG. 9 shows an example implementation of a security sensor of the security system shown in FIG. 6, in accordance with some embodiments of the present disclosure.

Turning now to FIG. 9, an example sensor assembly 924 is schematically illustrated. Several example implementations of the sensor assembly 924 (e.g., the cameras 102A and 102B, the motion sensor assembly 610, and the contact sensor assemblies 606) are illustrated in FIG. 6 and described above. As shown in FIG. 9, the sensor assembly 924 may include at least one processor 902, volatile memory 904, non-volatile memory 908, at least one network interface 906, a battery assembly 916, an interconnection mechanism 918, and at least one sensor 922. The non-volatile memory 908 may store executable code 910 and, as illustrated, may also include a data store 912. In some implementations, the features of the sensor assembly 924 enumerated above may be incorporated within, or included as a part of, a housing 920. Further, in some implementations, the sensor assembly 924 may additionally include a user interface 914.

In some implementations, the respective descriptions of the processor 702, the volatile memory 704, the non-volatile memory 708, the interconnection mechanism 718, and the battery assembly 716 with reference to the base station 612 are applicable to the processor 902, the volatile memory 904, the non-volatile memory 908, the interconnection mechanism 918, and the battery assembly 916 with reference to the sensor assembly 924. As such, those descriptions will not be repeated here.

Through execution of the code 910, the processor 902 may control operation of the network interface 906 and the user interface 914 (if present). In some implementations, the network interface 906 may include one or more physical interfaces (e.g., a radio, an ethernet port, a USB port, etc.) and a software stack including drivers and/or other code 910 that is configured to communicate with the one or more physical interfaces to support one or more LAN, PAN, and/or WAN standard communication protocols. Such communication protocols may include, for example, TCP and UDP, among others. As such, the network interface 906 may enable the sensor assembly 924 to access and communicate with other computing devices (e.g., the other devices disposed in the monitored location 104 of FIG. 6) via a computer network (e.g., the LAN established by the router 614). For instance, in some implementations, when executing the code 910, the processor 902 may control the network interface to stream (e.g., via UDP) sensor data acquired from the sensor assembly 922 to the base station 612. Further, in some implementations, through execution of the code 910, the processor 902 may additionally or alternatively control the network interface 906 to enter a power conservation mode, e.g., by powering down a 2.4 GHz radio and powering up a sub-GHz radio that are both included in the network interface 906. In such implementations, through execution of the code 910, the processor 902 may additionally control the network interface 906 to enter a streaming mode, e.g., by powering up a 2.4 GHz radio and powering down a sub-GHz radio, for example, in response to receiving a wake signal from the base station via the sub-GHz radio.

Through execution of the code 910, the processor 902 may additionally or alternatively control other operations of the sensor assembly 924. In some implementations, for example, a user interface 914 of the sensor assembly 924 may include user input and/or output devices (e.g., physical buttons, a touchscreen, a display, a speaker, a camera, an accelerometer, a biometric scanner, an environmental sensor, one or more LEDs, etc.) and a software stack including drivers and/or other code 910 that is configured to communicate with the user input and/or output devices. As such, the sensor assembly 924 may enable the user interface 914 to interact with users to receive inputs and/or render outputs. The outputs rendered by the user interface 814 may include, for example, one or more GUIs including one or more controls configured to display output and/or receive input. The inputs received by the user interface 914 may, for example, specify values that are to be stored in the data store 912. The outputs provided by the user interface 94 may further indicate values stored in the data store 912. In some implementations, parts of sensor assembly 924 may be accessible and/or visible as part of, or through, the housing 920.

As shown in FIG. 9, the sensor assembly 924 may include one or more types of sensors 922, such as one or more of the sensors described above with reference to the cameras 102A and 102B, the motion sensor assembly 610, and the contact sensor assembly 606 of FIG. 6, or other types of sensors. In some implementations, for example, the sensor(s) 922 may include a camera and a temperature sensor. Regardless of the type(s) of sensor(s) 922 that employed, the processor 902 may (e.g., via execution of the code 910) acquire sensor data from the sensor(s) 922 and stream the acquired sensor data to the processor 902 for communication to the base station 612.

It should be noted that, in some implementations of the devices 802 and 902, the operations executed by the processors 802 and 902 while under control of respective control of the code 810 and 910 may be hardcoded and/or implemented using hardware, rather than as a combination of hardware and software.

Figure 10:
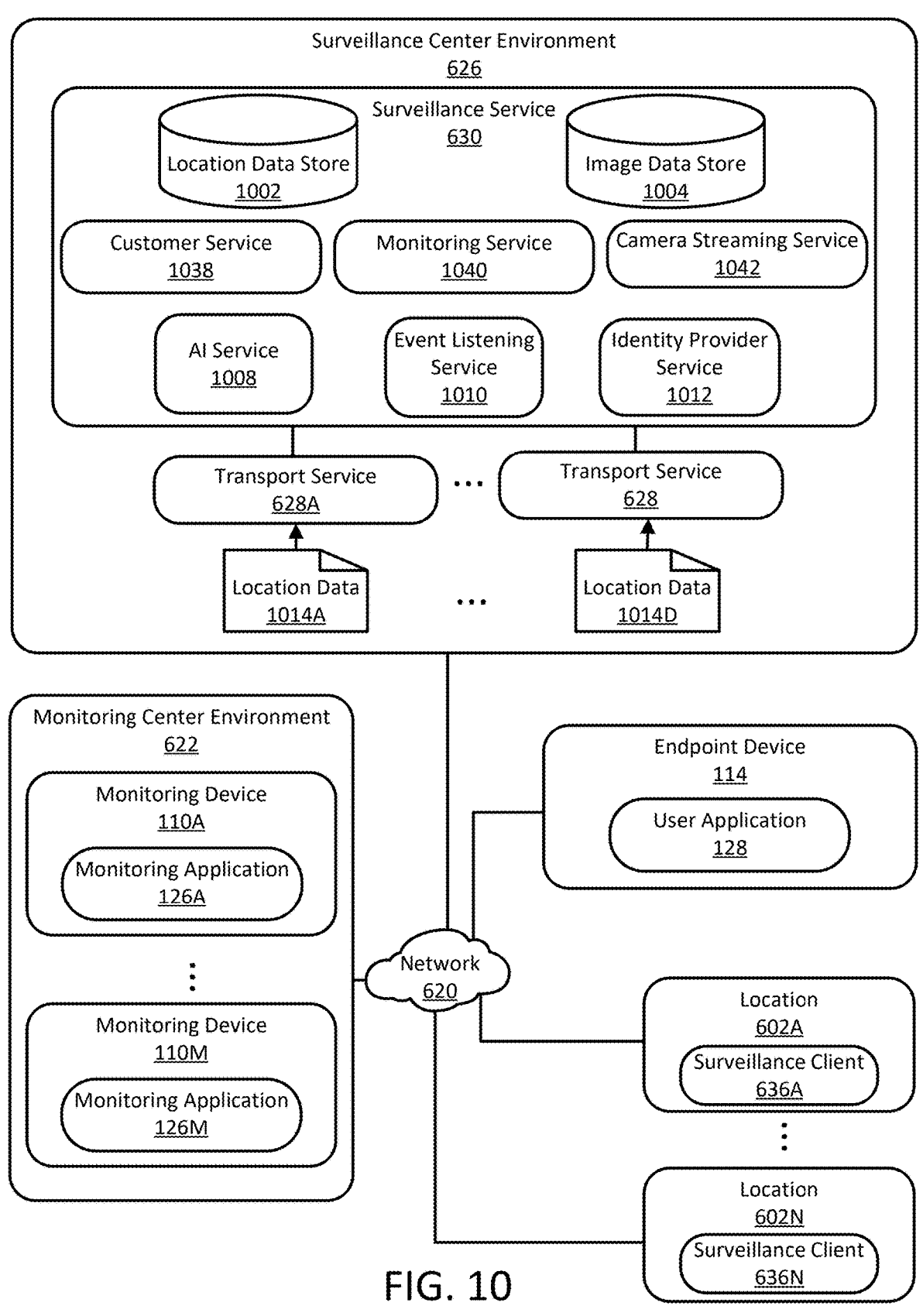
FIG. 10 shows example implementations of the surveillance center environment and the monitoring center environment of the security system shown in FIG. 6, in accordance with some embodiments of the present disclosure.

Turning now to FIG. 10, aspects of the surveillance center environment 626, the monitoring center environment 622, one of the endpoint devices 114, the network(s) 620, and a plurality of monitored locations 104A through 104N (collectively referred to as the monitored locations 104) shown in FIG. 6 are schematically illustrated. As shown in FIG. 10, in some implementations, the surveillance service 630 may include a location data store 1002, an image data store 1004, an artificial intelligence (AI) service 1008, an event listening service 1010, an identity provider service 1012, a customer service 1038, a monitoring service 1040, and a camera streaming service 1042. As also shown in FIG. 10, the monitoring center environment 622 may include multiple monitoring devices 110A through 110M (collectively referred to as the monitoring devices 110), and individual monitored locations 104A through 104N may include respective surveillance clients 616A through 616N (collectively referred to as the surveillance clients 616), e.g., within base stations 612 (not shown in FIG. 10) at the various monitored locations 104A through 104N. Further, as also shown, in some implementations, the transport service(s) 628 may include multiple different transport services 628A through 628D configured to receive location data packages, e.g., location data packages 1014A through 1014D, from the surveillance clients 616A through 616N deployed at the respective monitored locations 104A through 104N.

The location data store 1002 of the surveillance service 630 may be configured to store, within a plurality of records, location data in association with identifiers of users for whom the monitored location 104 is monitored. For example, the location data may be stored in a record with an identifier of a user and/or an identifier of the monitored location 104 to associate the location data with the user 116 and the monitored location 104. The image data store 1004 of the surveillance service 630 may be configured to store, within a plurality of records, one or more frames of image data in association with identifiers of locations and time-stamps at which the image data was acquired.

The AI service 1008 of the surveillance service 630 may be configured to process images and/or sequences of images to identify semantic regions, movement, human faces, and other features within images or a sequence of images. The event listening service 1010 of the surveillance service 630 may be configured to scan received location data for events and, where an event is identified, execute one or more event handlers to process the event. In some implementations, such event handlers may be configured to identify reportable events and to communicate messages concerning those reportable events to one or more recipient services (e.g., the customer service 1038 and/or the monitoring service 1040). Operations that may be performed by the customer service 1038 and/or the monitoring service 1040 based on the reportable events identified by the event listening service 1010 are described further below. In some implementations, the event listening service 1010 may interoperate with the AI service 1008 to identify events within image data.

The identity provider service 1012 may be configured to receive authentication requests from the surveillance clients 616 that include security credentials. When the identity provider 1012 can authenticate the security credentials in a request (e.g., via a validation function, cross-reference look-up, or some other authentication process), the identity provider 1012 may communicate a security token in response to the request. A surveillance client 616 may receive, store, and include the security token in subsequent packages of location data (e.g., the location data 1014A), so that the recipient transport service (e.g., the transport service 628A) is able to securely process (e.g., unpack/parse) the packages to extract the location data prior to passing the location data to the surveillance service 630.

The transport service(s) 628 of the surveillance center environment 626 may be configured to receive the location data packages 1014, verify the authenticity of the packages 1014, parse the packages 1014, and extract the location data encoded therein prior to passing the location data to the surveillance service 630 for processing. The location data that is so processed may include any of the location data types described above with reference to FIG. 6. In some implementations, individual transport services 628 may be configured to process location data packages 1014 generated by location-based monitoring equipment of particular manufacturers and/or models. The surveillance clients 616 may be configured to generate and communicate, to the surveillance service 630 via the network(s) 620, packages of location data (e.g., the location data packages 1014) based on sensor information received at the monitored location 104s.

The monitoring service 1040 may maintain records concerning the reportable events identified by the event listening service 1010, and may assign individual reportable events to various monitoring agents 112 who are currently on-line with monitoring applications 126.

In response to the monitoring agent 112 identifying a particular reportable event to review, the monitoring service 1040 may interact with the camera streaming service 1042 to obtain access credentials to enable the establishment of peer-to-peer connections with one or more cameras 102 at the monitored location 104 corresponding to the reportable event, and to review live video and/or audio streamed from those cameras, as well as to verbally communicate in real time with one or more individuals in the vicinity of the camera(s) 102.

Figure 11:
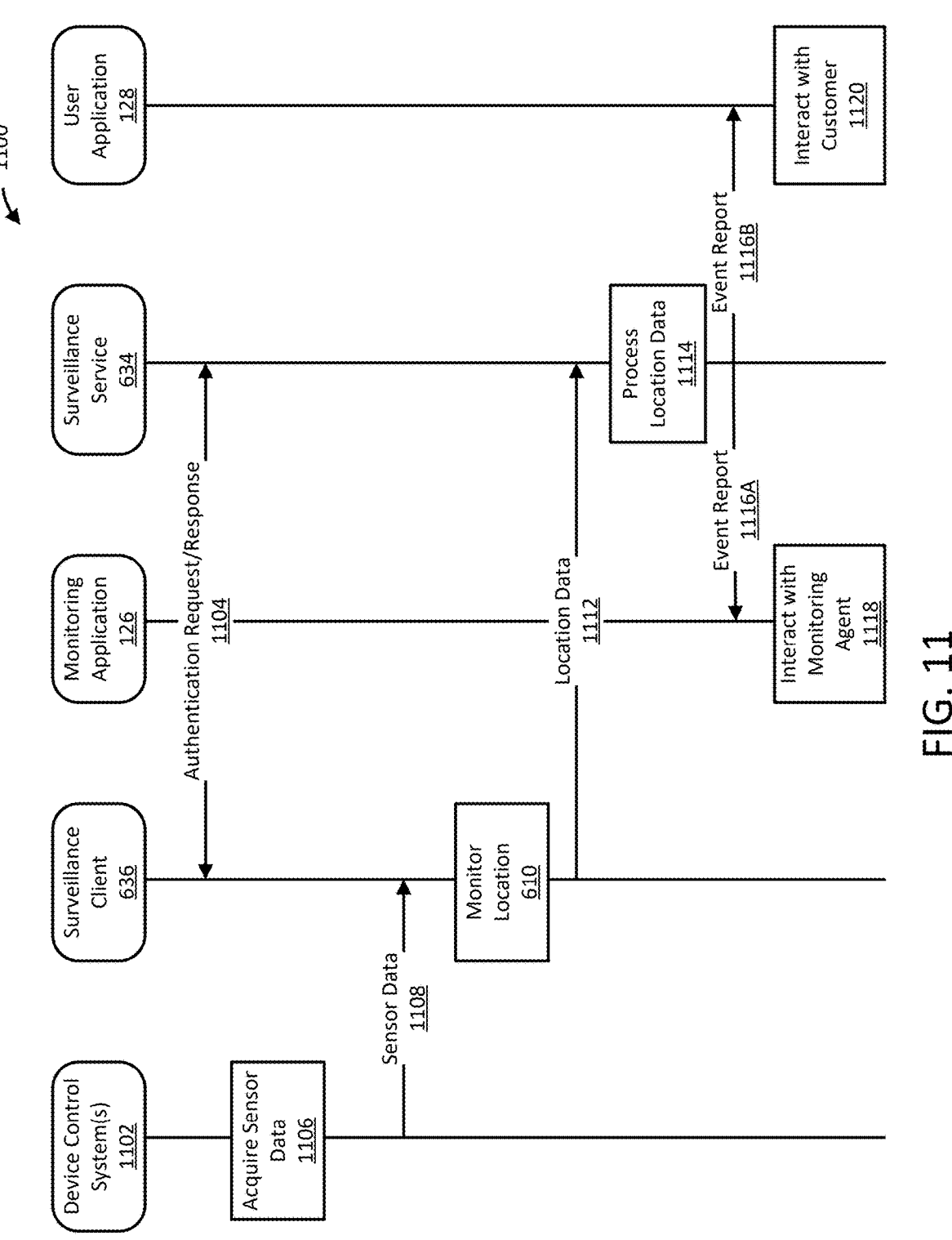
FIG. 11 is a sequence diagram of a monitoring process that may be performed by components of the security system shown in FIG. 6, in accordance with some embodiments of the present disclosure.

Turning now to FIG. 11, an example monitoring process 1100 that may be employed by the security system 600 is illustrated as a sequence diagram. In particular, in some implementations, various portions of the process 1100 may be executed by (A) one or more location-based devices (e.g., the devices 102 and 606 through 610 of FIG. 6) under the control of device control system (DCS) code (e.g., either the code 810 or 910) implemented by at least one processor (e.g., either of the processors 802 or 902 of FIG. 8 or 9); (B) a base station (e.g., the base station 612 of FIG. 6) under control of a surveillance client (e.g., the surveillance client 616 of FIG. 6); (C) a monitoring center environment (e.g., the monitoring center environment 622 of FIG. 6) under control of a monitoring application (e.g., the monitoring application 126 of FIG. 6); (D) a surveillance center environment (e.g., the surveillance center environment 626 of FIG. 6) under control of a surveillance service (e.g., the surveillance service 630 of FIG. 6); and (E) a user device (e.g., the endpoint device 114 of FIG. 6) under control of a user application (e.g., user application 128 of FIG. 6).

As shown in FIG. 11, the process 1100 may begin with the surveillance client 616 authenticating with the surveillance service 630 by exchanging one or more authentication requests and responses 1104 with the surveillance service 630. More specifically, in some implementations, the surveillance client 616 may communicate an authentication request to the surveillance service 630 via one or more API calls to the surveillance service 630. In such implementations, the surveillance service 630 may parse the authentication request to extract security credentials therefrom and pass such security credentials to an identity provider (e.g., the identity provider service 1012 of FIG. 10) for authentication. In some implementations, upon the identity provider authenticating the security credentials, the surveillance service 630 may generate a security token and communicate that security token as a payload within an authentication response to the authentication request. In such implementations, if the identity provider is unable to authenticate the security credentials, the surveillance service 630 may instead generate an error code and communicate that error code as the payload within the authentication response to the authentication request. Upon receipt of the authentication response, the surveillance client 616 may parse the authentication response to extract the payload. If the payload includes the error code, the surveillance client 616 may retry authentication and/or interoperate with a user interface of its host device (e.g., the user interface 714 of the base station 612 of FIG. 7) to render output indicating the authentication failure. If the payload includes the security token, the surveillance client 616 may store the security token for subsequent use in communication of location data. It should be noted that, in some implementations, the security token may have a limited lifespan (e.g., one hour, one day, one week, one month, etc.) after which the surveillance client 616 may be required to reauthenticate with the surveillance service 630.

Continuing with the process 1100, one or more device control systems 1102 hosted by one or more location-based devices may acquire (1106) sensor data descriptive of a location (e.g., the monitored location 104 of FIG. 6). The sensor data that is so acquired may be any of a variety of types, as discussed above with reference to FIGS. 6-12. In some implementations, one or more of the device control systems 1102 may acquire sensor data continuously. In other implementations, one or more of the DCSs 1102 may additionally or alternatively acquire sensor data in response to an event, such as expiration of a timer (a push event) or receipt of an acquisition polling signal communicated by the surveillance client 616 (a poll event). In some implementations, one or more of the device control systems 1102 may stream sensor data to the surveillance client 616 with minimal processing beyond acquisition and digitization. In such implementations, the sensor data may constitute a sequence of vectors with each vector member including, for example, a sensor reading and a timestamp. In some implementations, one or more of the device control systems 1102 may execute additional processing of sensor data, such as generation of one or more summaries of multiple sensor readings. Further still, in some implementations, one or more of the device control systems 1102 may execute sophisticated processing of sensor data. For example, if the sensor(s) 922 of a sensor assembly 924 (shown in FIG. 9) include an image capture device, the device control system 1102 may execute image processing routines such as edge detection, motion detection, facial recognition, threat assessment, reportable event generation, etc.

Continuing with the process 1100, the device control component(s) 1102 may communicate the sensor data 1108 to the surveillance client 616. As with sensor data acquisition, the device control system(s) 1102 may communicate the sensor data 1108 continuously or in response to an event, such a push event (originating with the device control system(s) 1102) or a poll event (originating with the surveillance client 616).

Continuing with the process 1100, the surveillance client 616 may monitor (1110) the monitored location 104 by processing the received sensor data 1108. In some implementations, for example, the surveillance client 616 may execute one or more image processing routines. Such image processing routines may include any of the image processing routines described above with reference to the operation 1106. By distributing at least some of the image processing routines between the device control system(s) 1102 and surveillance client 616, the amount of power consumed by battery-powered devices may be decreased by off-loading processing to line-powered devices. Moreover, in some implementations, the surveillance client 616 may execute an ensemble threat detection process that utilizes sensor data 1108 from multiple, distinct device control systems 1102 as input. For instance, in some implementations, the surveillance client 616 may attempt to corroborate an open state received from a contact sensor with motion and facial recognition processing of an image of a scene including a window or door to which the contact sensor is affixed. If two or more of the three processes indicate the presence of an intruder, the threat score may be increased and or a break-in event may be declared, locally recorded, and communicated. Other processing that the surveillance client 616 may execute includes outputting local alerts (e.g., in response to detection of particular events and/or satisfaction of other criteria) and detection of maintenance conditions for location-based devices, such as a need to change or recharge low batteries and/or replace/maintain the devices that host the device control system(s) 1102. Any of the processes described above within the operation 1110 may result in the creation of location data that specifies the results of such processes.

Continuing with the process 1100, the surveillance client 616 may communicate the location data 1112 to the surveillance service 630 (via the transport service(s) 628). As with the communication of the sensor data 1108, the surveillance client 616 may communicate the location data 1112 continuously or in response to an event, such as a push event (originating with the surveillance client 616) or a poll event (originating with the surveillance service 630).

Continuing with the process 1100, the surveillance service 630 may process (1114) the received location data. In some implementations, for example, the surveillance service 630 may execute one or more of the processes described above with reference to the operations 1106 and/or 1110. In some implementations, the surveillance service 630 may additionally or alternatively calculate a threat score or further refine an existing threat score using historical information associated with the monitored location 104 identified in the location data and/or other locations geographically proximal to the monitored location 104 (e.g., within the same zone improvement plan (ZIP) code). For instance, in some implementations, if multiple break-ins have been recorded for the monitored location 104 and/or other locations within the same ZIP code, the surveillance service 630 may increase a threat score calculated by a device control system 1102 and/or the surveillance client 616.

In some implementations, the surveillance service 630 may apply a set of rules and criteria to the location data 1112 to determine whether the location data 1112 includes any reportable events and, if so, communicate an event report 1116A and/or 1116B to the monitoring application 126 and/or the user application 128. In some implementations, for example, the monitoring service 1040 may assign one or more reportable events to a particular monitoring agent 112, so that those reportable events will be forwarded to the monitoring application 126 that monitoring agent 112 is operating. A reportable event may, for example, be an event of a certain type (e.g., break-in) or an event of a certain type that satisfies additional criteria (e.g., movement within a particular zone combined with a threat score that exceeds a threshold value). The event reports 1116A and/or 1116B may have a priority based on the same criteria used to determine whether the event reported therein is reportable or may have a priority based on a different set of criteria or rules.

Continuing with the process 1100, the monitoring application 126 within the monitoring center environment 622 may interact (1118) with monitoring agents 112 through, for example, one or more GUIs. Such GUIs may provide details and context regarding one or more reportable events.

As shown in FIG. 11, the user application 128 of a endpoint device 114 (e.g., a smartphone or personal computer) may likewise interact (1120) with at least one user through, for example, one or more GUIs. Such GUIs may provide details and context regarding one or more reportable events.

It should be noted that the processing of sensor data and/or location data, as described above with reference to the operations 1106, 1110, and 1114, may be executed by processors disposed within various parts of the security system 600. In some implementations, the device control system(s) 1102 may execute minimal processing of the sensor data (e.g., acquisition and streaming only) and the remainder of the processing described above may be executed by the surveillance client 616 and/or the surveillance service 630. This approach may be helpful to prolong battery runtime of location-based devices. In other implementations, the device control system(s) 1102 may execute as much of the sensor data processing as possible, leaving the surveillance client 616 and the surveillance service 630 to execute only processes that require sensor data that spans location-based devices and/or locations. Such an approach may be helpful to increase scalability of the security system 600 with regard to adding new locations.

Figure 12:
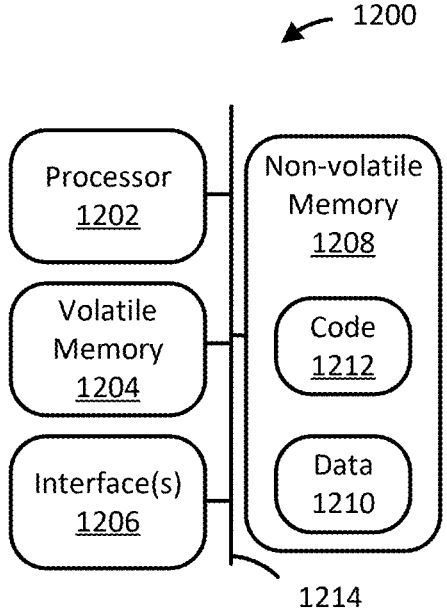
FIG. 12 is a schematic diagram of a computing device that may be used to implement a endpoint device, a monitoring device, and/or one or more of the services of the of the security system shown in FIG. 6, in accordance with some embodiments of the present disclosure.

Turning now to FIG. 12, an example computing device 1200 is illustrated schematically. The computing device 1200 may correspond, for example, to a monitoring device 110, an endpoint device 114, or a server 108 of the type described above. As shown in FIG. 12, the computing device 1200 may include at least one processor 1202, volatile memory 1204, one or more interfaces 1206, non-volatile memory 1208, and an interconnection mechanism 1214. The non-volatile memory 1208 may include executable code 1210 and, as illustrated, may additionally include at least one data store 1212.

In some implementations, the non-volatile (non-transitory) memory 1208 may include one or more read-only memory (ROM) chips; one or more hard disk drives or other magnetic or optical storage media; one or more solid state drives (SSDs), such as a flash drive or other solid-state storage media; and/or one or more hybrid magnetic and SSDs. Further in some implementations, the code 1210 stored in the non-volatile memory may include an operating system and one or more applications or programs that are configured to execute under control of the operating system. In some implementations, the code 1210 may additionally or alternatively include specialized firmware and embedded software that is executable without dependence upon a commercially available operating system. Regardless of its configuration, execution of the code 1210 may result in manipulated data that may be stored in the data store 1212 as one or more data structures. The data structures may have fields that are associated through location in the data structure. Such associations may likewise be achieved by allocating storage for the fields in locations within memory that convey an association between the fields. However, other mechanisms may be used to establish associations between information in fields of a data structure, including through the use of pointers, tags, or other mechanisms.

The processor 1202 of the computing device 1200 may be embodied by one or more processors that are configured to execute one or more executable instructions, such as a computer program specified by the code 1210, to control the operations of the computing device 1200. The function, operation, or sequence of operations can be hard coded into the circuitry or soft coded by way of instructions held in a memory device (e.g., the volatile memory 1204) and executed by the circuitry. In some implementations, the processor 1202 may be embodied by one or more application specific integrated circuits (ASICs), microprocessors, digital signal processors (DSPs), graphics processing units (GPUs), neural processing units (NPUs), microcontrollers, field programmable gate arrays (FPGAs), programmable logic arrays (PLAs), or multicore processors.

Prior to execution of the code 1210, the processor 1202 may copy the code 1210 from the non-volatile memory 1208 to the volatile memory 1204. In some implementations, the volatile memory 1204 may include one or more static or dynamic random access memory (RAM) chips and/or cache memory (e.g. memory disposed on a silicon die of the processor 1202). Volatile memory 1204 may offer a faster response time than a main memory, such as the non-volatile memory 1208.

Through execution of the code 1210, the processor 1202 may control operation of the interfaces 1206. The interfaces 1206 may include network interfaces. Such network interfaces may include one or more physical interfaces (e.g., a radio, an ethernet port, a USB port, etc.) and a software stack including drivers and/or other code 1210 that is configured to communicate with the one or more physical interfaces to support one or more LAN, PAN, and/or WAN standard communication protocols. Such communication protocols may include, for example, TCP and UDP among others. As such, the network interfaces may enable the computing device 1200 to access and communicate with other computing devices via a computer network.

The interface(s) 1206 may include one or more user interfaces. For instance, in some implementations, the user interface(s) 1206 may include user input and/or output devices (e.g., a keyboard, a mouse, a touchscreen, a display, a speaker, a camera, an accelerometer, a biometric scanner, an environmental sensor, etc.) and a software stack including drivers and/or other code 1210 that is configured to communicate with the user input and/or output devices. As such, the user interface(s) 1206 may enable the computing device 1200 to interact with users to receive input and/or render output. The rendered output may include, for example, one or more GUIs including one or more controls configured to display outputs and/or receive inputs. The received inputs may specify values to be stored in the data store 1212. The displayed outputs may indicate values stored in the data store 1212.

The various features of the computing device 1200 described above may communicate with one another via the interconnection mechanism 1214. In some implementations, the interconnection mechanism 1214 may include a communications bus.

The following clauses describe examples of inventive concepts disclosed herein.

Clause 1. A method, comprising: determining, by a computing device, that a plurality of frames of image data represent an object of a first type, the plurality of frames including at least first and second frames; determining, by the computing device, at least first and second parameters indicative of first and second positions of a bounding box of the object within the first and second frames, respectively;

calculating, by the computing device and using at least the first parameter and the second parameter, at least one first rate at which a position of the bounding box is changing from frame to frame within the plurality of frames; determining, by the computing device, a variable that is based at least in part on the at least one first rate; determining, by the computing device, that the variable satisfies a first criterion; and causing, by the computing device and based at least in part on the variable satisfying the first criterion, acquired video to be recorded in a datastore.

Clause 2. The method of clause 1, further comprising: determining, by the computing device, at least third and fourth parameters indicative of first and second sizes of a bounding box of the object within the first and second frames, respectively; and calculating, by the computing device and using at least the third parameter and the fourth parameter, at least one second rate at which a size of the bounding box is changing from frame to frame within the plurality of frames; wherein determining the variable includes determining the variable further based at least in part on the at least one second rate.

Clause 3. The method of clause 2, wherein: determining the first and second parameters includes processing the first and second frames using a machine learning model to determine first coordinates of a first bounding box around the object in the first frame and second coordinates of a second bounding box around the object in the second frame; and determining the third and fourth parameters includes processing the first and second frames using the machine learning model to determine a first size of the first bounding box around the object in the first frame and a second size of the second bounding box around the object in the second frame.

Clause 4. The method of clause 3, wherein: calculating the at least one first rate includes processing at least the first coordinates and the second coordinates to determine a first velocity at which the bounding box is moving in vertical direction and a second velocity at which the bounding box is moving in a horizontal direction; and calculating the at least one second rate includes processing at least the first size and the second size to determine the at least one second rate.

Clause 5. The method of clause 4, wherein determining the variable includes combining a first variable representing the first velocity, a second variable representing the second velocity, and a third variable representing the at least one second rate to determine the variable.

Clause 6. The method of any of clauses 1-5, further comprising: calculating, by the computing device and using at least the first parameter and the second parameter, a total distance traveled by the object since the object was initially detected; and determining, by the computing device, that the total distance traveled exceeds a threshold distance value; wherein causing the acquired video to be recorded in the datastore is further based at least in part on the total distance traveled exceeding the threshold distance value.

Clause 7. The method of any of clauses 1-6, further comprising: calculating, by the computing device and using at least the first parameter and the second parameter, a total displacement of the object since the object was initially detected; and determining, by the computing device, that the total displacement exceeds a threshold displacement value; wherein causing the acquired video to be recorded in the datastore is further based at least in part on the total displacement exceeding the threshold displacement value.

Clause 8. The method of any of clauses 1-7, wherein determining the first and second parameters includes processing the first and second frames using a machine learning model to determine first coordinates of a first bounding box around the object in the first frame and second coordinates of a second bounding box around the object in the second frame.

Clause 9. The method of clause 8, wherein calculating the at least one first rate includes processing at least the first coordinates and the second coordinates to determine a first velocity at which the bounding box is moving in vertical direction and a second velocity at which the bounding box is moving in a horizontal direction.

Clause 10. A method, comprising: determining, by a computing device, that a plurality of frames of image data represent an object of a first type, the plurality of frames including at least first and second frames; determining, by the computing device, at least first and second parameters indicative of first and second sizes of a bounding box of the object within the first and second frames, respectively; determining, by the computing device and using at least the first parameter and the second parameter, at least one rate at which a size of the bounding box is changing from frame to frame within the plurality of frames; determining, by the computing device, a variable that is based at least in part on the at least one rate; determining, by the computing device, that the variable satisfies a first criterion; and causing, by the computing device and based at least in part on the variable satisfying the first criterion, acquired video to be recorded in a datastore.

Clause 11. The method of clause 10, wherein determining the first and second parameters includes processing the first and second frames using a machine learning model to determine a first size of a first bounding box around the object in the first frame and a second size of a second bounding box around the object in the second frame.

Clause 12. The method of clause 11, wherein calculating the at least one rate includes processing at least the first size and the second size to determine the at least one rate.

Clause 13. A system, comprising: one or more processors; and one or more computer-readable mediums encoded with instructions which, when executed by the one or more processors, cause the system to: determine a plurality of frames of image data represent an object of a first type, the plurality of frames including at least first and second frames; determine at least first and second parameters indicative of first and second positions of a bounding box of the object within the first and second frames, respectively; calculate, and using at least the first parameter and the second parameter, at least one first rate at which a position of the bounding box is changing from frame to frame within the plurality of frames; determine a variable that is based at least in part on the at least one first rate; determine that the variable satisfies a first criterion; and cause, based at least in part on the variable satisfying the first criterion, acquired video to be recorded in a datastore.

Clause 14. The system of clause 13, wherein the one or more computer-readable mediums are further encoded with additional instructions which, when executed by the one or more processors, further cause the system to: determine at least third and fourth parameters indicative of first and second sizes of a bounding box of the object within the first and second frames, respectively; and calculate, using at least the third parameter and the fourth parameter, at least one second rate at which a size of the bounding box is changing from frame to frame within the plurality of frames.

Clause 15. The system of clause 14, wherein the one or more computer-readable mediums are further encoded with additional instructions which, when executed by the one or more processors, further cause the system to: determine the first and second parameters at least in part by processing the first and second frames using a machine learning model to determine first coordinates of a first bounding box around the object in the first frame and second coordinates of a second bounding box around the object in the second frame; and determine the third and fourth parameters at least in part by processing the first and second frames using the machine learning model to determine a first size of the first bounding box around the object in the first frame and a second size of the second bounding box around the object in the second frame.

Clause 16. The system of clause 15, wherein the one or more computer-readable mediums are further encoded with additional instructions which, when executed by the one or more processors, further cause the system to: calculate the at least one first rate at least in part by processing at least the first coordinates and the second coordinates to determine a first velocity at which the bounding box is moving in vertical direction and a second velocity at which the bounding box is moving in a horizontal direction; and calculate the at least one second rate at least in part by processing at least the first size and the second size to determine the at least one second rate.

Clause 17. The system of clause 16, wherein the one or more computer-readable mediums are further encoded with additional instructions which, when executed by the one or more processors, further cause the system to: determine the variable at least in part by combining a first variable representing the first velocity, a second variable representing the second velocity, and a third variable representing the at least one second rate to determine the variable.

Clause 18. The system of any of clauses 13-17, wherein the one or more computer-readable mediums are further encoded with additional instructions which, when executed by the one or more processors, further cause the system to: calculate, using at least the first parameter and the second parameter, a total distance traveled by the object since the object was initially detected; determine that the total distance traveled exceeds a threshold distance value; and cause the acquired video to be recorded in the datastore further based at least in part on the total distance traveled exceeding the threshold distance value.

Clause 19. The system of any of clauses 13-18, wherein the one or more computer-readable mediums are further encoded with additional instructions which, when executed by the one or more processors, further cause the system to: calculate, using at least the first parameter and the second parameter, a total displacement of the object since the object was initially detected; determine that the total displacement exceeds a threshold displacement value; and cause the acquired video to be recorded in the datastore further based at least in part on the total displacement exceeding the threshold displacement value.

Clause 20. The system of any of clauses 13-19, wherein the one or more computer-readable mediums are further encoded with additional instructions which, when executed by the one or more processors, further cause the system to: determine the first and second parameters at least in part by processing the first and second frames using a machine learning model to determine first coordinates of a first bounding box around the object in the first frame and second coordinates of a second bounding box around the object in the second frame; and calculate the at least one first rate at least in part by processing at least the first coordinates and the second coordinates to determine a first velocity at which the bounding box is moving in vertical direction and a second velocity in which the bounding box is moving in a horizontal direction.

Various inventive concepts may be embodied as one or more methods, of which examples have been provided. The acts performed as part of a method may be ordered in any suitable way. Accordingly, examples may be constructed in which acts are performed in an order different than illustrated, which may include performing some acts simultaneously, even though shown as sequential acts in illustrative examples.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

Examples of the methods and systems discussed herein are not limited in application to the details of construction and the arrangement of components set forth in the following description or illustrated in the accompanying drawings. The methods and systems are capable of implementation in other examples and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, components, elements or acts of the systems and methods herein referred to in the singular can also embrace examples including a plurality, and any references in plural to any example, component, element or act herein can also embrace examples including only a singularity. References in the singular or plural form are not intended to limit the presently disclosed systems or methods, their components, acts, or elements.

The use herein of "including," "comprising," "having," "containing," "involving," and variations thereof is meant to encompass the items listed thereafter and equivalents thereof as well as additional items. References to "or" can be construed as inclusive so that any terms described using "or" can indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

Having described several examples in detail, various modifications and improvements will readily occur to those skilled in the art. Such modifications and improvements are intended to be within the scope of this disclosure. Accordingly, the foregoing description is by way of example only, and is not intended as limiting.

What is claimed is:
1. A method, comprising:
determining, by a computing device and by performing object recognition processing on a plurality of frames of image data, that the plurality of frames represent an object of a first type, the plurality of frames including at least first and second frames;

determining, by the computing device, at least first and second parameters indicative of first and second positions of a bounding box of the object within the first and second frames, respectively;

determining, by the computing device and using at least the first parameter and the second parameter, a variable indicative of an amount of movement of the object;

determining, by the computing device, that the variable satisfies a first criterion; and causing, by the computing device and based at least in part on the variable satisfying the first criterion, acquired video to be recorded in a datastore.

2. The method of claim 1, wherein:

the plurality of frames further includes a third frame;

the method further comprises determining, by the computing device, a third parameter indicative of a third position of the bounding box of the object within the third frame;

determining the variable includes determining, using at least the first parameter, the second parameter, and the third parameter, a total distance traveled by the object throughout the plurality of frames; determining that the variable satisfies the first criterion includes determining that the total distance traveled exceeds a threshold distance value; and causing the acquired video to be recorded in the datastore is further based at least in part on the total distance traveled exceeding the threshold distance value.

3. The method of claim 1, wherein:

the plurality of frames further includes a third frame;

the method further comprises determining, by the computing device, a third parameter indicative of a third position of the bounding box of the object within the third frame;

determining the variable includes determining, using at least the first parameter, the second parameter, and the third parameter, a total displacement of the object throughout the plurality of frames;

determining that the variable satisfies the first criterion includes determining that the total displacement exceeds a threshold displacement value; and causing the acquired video to be recorded in the datastore is further based at least in part on the total displacement exceeding the threshold displacement value.

4. The method of claim 1, wherein determining the first and second parameters includes processing the first and second frames using a machine learning model to determine first coordinates of a first bounding box around the object in the first frame and second coordinates of a second bounding box around the object in the second frame.

5. The method of claim 1, wherein determining the variable includes:

determining, using at least the first parameter and the second parameter, at least one first rate at which a position of the bounding box is changing from frame to frame within the plurality of frames; and determining the variable based at least on part on the at least one first rate.

6. The method of claim 5, further comprising:

determining, by the computing device, at least third and fourth parameters indicative of first and second sizes of a bounding box of the object within the first and second frames, respectively; and determining, by the computing device and using at least the third parameter and the fourth parameter, at least one second rate at which a size of the bounding box is changing from frame to frame within the plurality of frames;

wherein determining the variable includes determining the variable further based at least in part on the at least one second rate.

7. The method of claim 6, wherein:

determining the first and second parameters includes processing the first and second frames using a machine learning model to determine first coordinates of a first bounding box around the object in the first frame and second coordinates of a second bounding box around the object in the second frame; and determining the third and fourth parameters includes processing the first and second frames using the machine learning model to determine a first size of the first bounding box around the object in the first frame and a second size of the second bounding box around the object in the second frame.

8. The method of claim 7, wherein:

determining the at least one first rate includes processing at least the first coordinates and the second coordinates to determine a first velocity at which the bounding box is moving in vertical direction and a second velocity at which the bounding box is moving in a horizontal direction; and determining the at least one second rate includes processing at least the first size and the second size to determine the at least one second rate.

9. The method of claim 8, wherein determining the variable includes combining a first variable representing the first velocity, a second variable representing the second velocity, and a third variable representing the at least one second rate to determine the variable.

10. A method, comprising:

determining, by a computing device, and by performing object recognition processing on a plurality of frames of image data, that the plurality of frames represent an object of a first type, the plurality of frames including at least first and second frames;

determining, by the computing device, at least first and second parameters indicative of first and second sizes of a bounding box of the object within the first and second frames, respectively;

determining, by the computing device and using at least the first parameter and the second parameter, a variable indicative of an amount of movement of the object;

determining, by the computing device, that the variable satisfies a first criterion; and causing, by the computing device and based at least in part on the variable satisfying the first criterion, acquired video to be recorded in a datastore.

11. The method of claim 10, wherein determining the first and second parameters includes processing the first and second frames using a machine learning model to determine a first size of a first bounding box around the object in the first frame and a second size of a second bounding box around the object in the second frame.

12. The method of claim 10, wherein determining the variable includes:

determining, using at least the first parameter and the second parameter, at least one rate at which a size of the bounding box is changing from frame to frame within the plurality of frames; and determining the variable based at least in part on the at least one rate.

13. A system, comprising:

one or more processors; and one or more computer-readable mediums encoded with instructions which, when executed by the one or more processors, cause the system to:

determine, by performing object recognition processing on a plurality of frames of image data, that the plurality of frames represent an object of a first type, the plurality of frames including at least first and second frames;

determine at least first and second parameters indicative of first and second positions of a bounding box of the object within the first and second frames, respectively;

determine, using at least the first parameter and the second parameter, a variable indicative of an amount of movement of the object;

determine that the variable satisfies a first criterion; and cause, based at least in part on the variable satisfying the first criterion, acquired video to be recorded in a datastore.

14. The system of claim 13, wherein the plurality of frames further includes a third frame, and the one or more computer-readable mediums are further encoded with additional instructions which, when executed by the one or more processors, further cause the system to:

determine a third parameter indicative of a third position of the bounding box of the object within the third frame;

determine the variable at least in part by determining, using at least the first parameter, the second parameter, and the third parameter, a total distance traveled by the object throughout the plurality of frames;

determine that the variable satisfies the first criterion at least in part by determining that the total distance traveled exceeds a threshold distance value; and cause the acquired video to be recorded in the datastore further based at least in part on the total distance traveled exceeding the threshold distance value.

15. The system of claim 13, wherein the plurality of frames further includes a third frame, and the one or more computer-readable mediums are further encoded with additional instructions which, when executed by the one or more processors, further cause the system to:

determine a third parameter indicative of a third position of the bounding box of the object within the third frame;

determine the variable at least in part by determining, using at least the first parameter, the second parameter, and the third parameter a total displacement of the object throughout the plurality of frames;

determine that the variable satisfies the first criterion at least in part by determining that the total displacement exceeds a threshold displacement value; and cause the acquired video to be recorded in the datastore further based at least in part on the total displacement exceeding the threshold displacement value.

16. The system of claim 13, wherein the one or more computer-readable mediums are further encoded with additional instructions which, when executed by the one or more processors, further cause the system to determine the variable at least in part by:

determining, using at least the first parameter and the second parameter, at least one first rate at which a position of the bounding box is changing from frame to frame within the plurality of frames; and determining the variable based at least on part on the at least one first rate.

17. The system of claim 16, wherein the one or more computer-readable mediums are further encoded with additional instructions which, when executed by the one or more processors, further cause the system to:

determine at least third and fourth parameters indicative of first and second sizes of a bounding box of the object within the first and second frames, respectively; and determine, using at least the third parameter and the fourth parameter, at least one second rate at which a size of the bounding box is changing from frame to frame within the plurality of frames.

18. The system of claim 17, wherein the one or more computer-readable mediums are further encoded with additional instructions which, when executed by the one or more processors, further cause the system to:

determine the first and second parameters at least in part by processing the first and second frames using a machine learning model to determine first coordinates of a first bounding box around the object in the first frame and second coordinates of a second bounding box around the object in the second frame; and determine the third and fourth parameters at least in part by processing the first and second frames using the machine learning model to determine a first size of the first bounding box around the object in the first frame and a second size of the second bounding box around the object in the second frame.

19. The system of claim 18, wherein the one or more computer-readable mediums are further encoded with additional instructions which, when executed by the one or more processors, further cause the system to:

determine the at least one first rate at least in part by processing at least the first coordinates and the second coordinates to determine a first velocity at which the bounding box is moving in vertical direction and a second velocity at which the bounding box is moving in a horizontal direction; and determine the at least one second rate at least in part by processing at least the first size and the second size to determine the at least one second rate.

20. The system of claim 19, wherein the one or more computer-readable mediums are further encoded with additional instructions which, when executed by the one or more processors, further cause the system to:

determine the variable at least in part by combining a first variable representing the first velocity, a second variable representing the second velocity, and a third variable representing the at least one second rate to determine the variable.

* * * * *